United States Patent
Baghsorkhi

(10) Patent No.: US 9,921,841 B2
(45) Date of Patent: Mar. 20, 2018

(54) SYSTEM AND METHOD FOR EXECUTING AN INSTRUCTION TO PERMUTE A MASK

(71) Applicant: Intel Corporation, Santa Clara, CA (US)

(72) Inventor: Sara Baghsorkhi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 15/052,801

(22) Filed: Feb. 24, 2016

(65) Prior Publication Data

US 2017/0242697 A1    Aug. 24, 2017

(51) Int. Cl.
*G06F 9/30* (2006.01)
*G06F 9/38* (2006.01)

(52) U.S. Cl.
CPC .......... *G06F 9/3016* (2013.01); *G06F 9/3802* (2013.01)

(58) Field of Classification Search
None
See application file for complete search history.

(56) References Cited

U.S. PATENT DOCUMENTS

| | | | | |
|---|---|---|---|---|
| 6,763,034 | B1 * | 7/2004 | Jones | H04L 49/102 370/445 |
| 8,051,226 | B2 * | 11/2011 | Moyer | G06F 9/30032 710/52 |
| 9,804,850 | B2 * | 10/2017 | Hughes | G06F 9/30145 |
| 2009/0037694 | A1 * | 2/2009 | Luick | G06F 9/30018 712/204 |
| 2009/0313442 | A1 | 12/2009 | Moyer | |
| 2014/0101358 | A1 | 4/2014 | Kaltenbach et al. | |
| 2014/0372727 | A1 | 12/2014 | Valentine et al. | |
| 2015/0026439 | A1 | 1/2015 | Ould-Ahmed-Vall et al. | |
| 2015/0058603 | A1 | 2/2015 | Anderson et al. | |

OTHER PUBLICATIONS

International Search Report and Written Opinion for Application No. PCT/US2017/014975, dated Apr. 20, 2017, 14 pages.

* cited by examiner

*Primary Examiner* — Eric Coleman
(74) *Attorney, Agent, or Firm* — Nicholson De Vos Webster & Elliott, LLP

(57) ABSTRACT

A processor is described, including a fetch circuit to fetch an instruction, including a first source operand identifier, a second source operand identifier, and a destination operand identifier, a decode circuit to decode the instruction, a data retrieval circuit to retrieve data associated with the first source operand identifier and the second source operand identifier, and an execution circuit. In some embodiments, the execution circuit is configured to determine whether a first element of the data associated with the first source operand identifier is set, if the first element is set, to retrieve a destination index from a corresponding second element of the data associated with the second source operand identifier, and to use the destination index to select and set a destination element of data associated with the destination operand identifier.

20 Claims, 23 Drawing Sheets

| OPCODE | FIRST SOURCE OPERAND IDENTIFIER | SECOND SOURCE OPERAND IDENTIFIER | DESTINATION OPERAND IDENTIFIER |
|---|---|---|---|
| 202 | 204 | 206 | 208 |

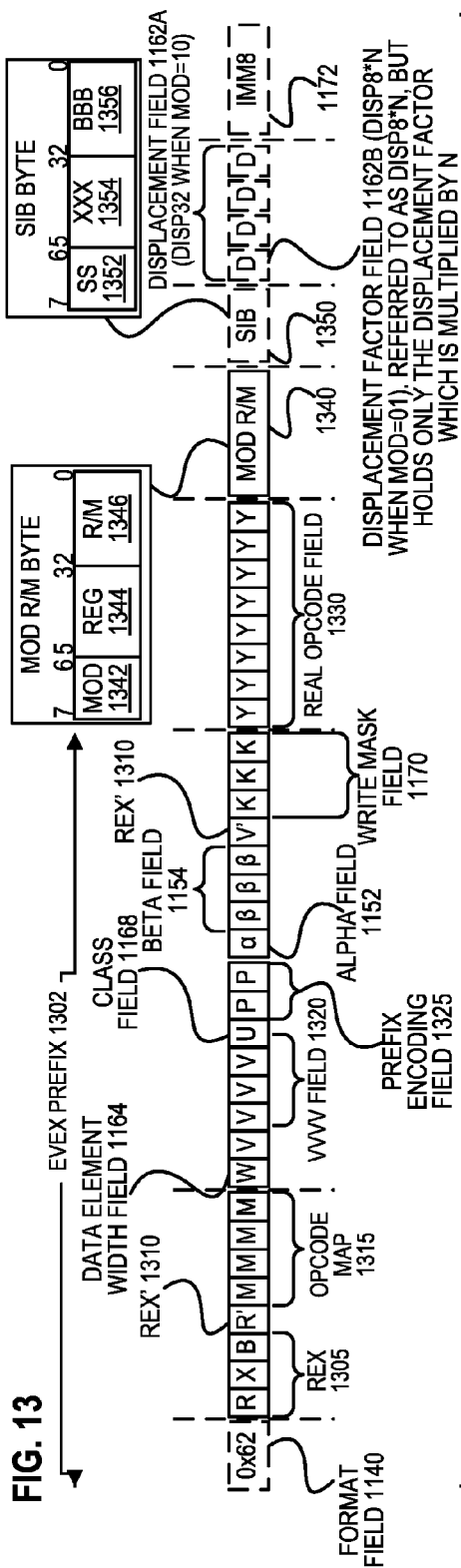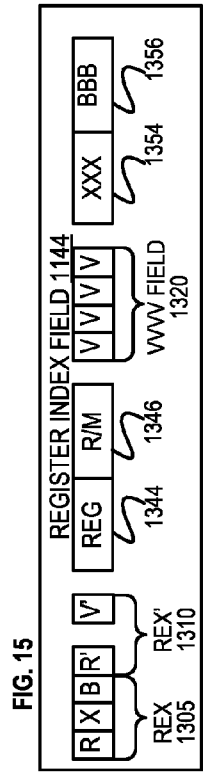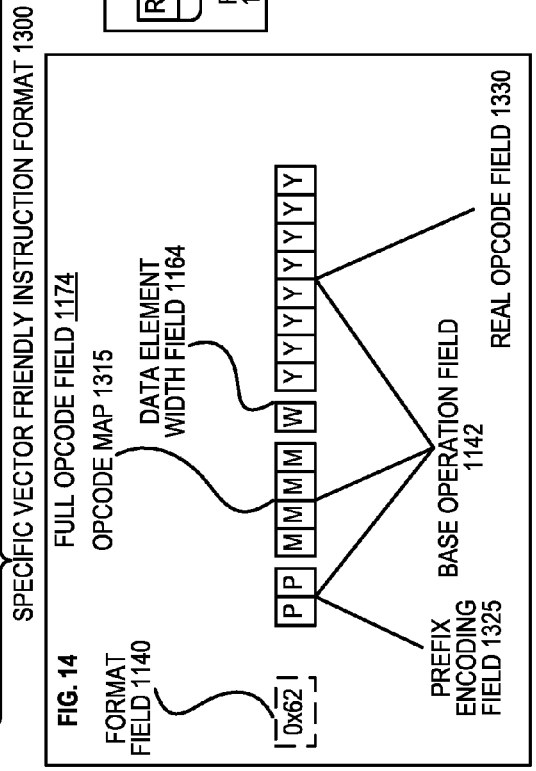

FIG. 17
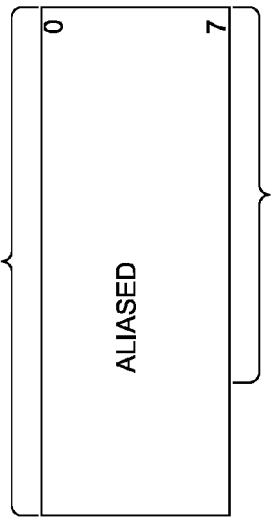
SCALAR FP STACK REGISTER FILE 1745 (X87FP) 80 BITS
ALIASED
64 BITS
MMX PACKED INT FLAT REGISTER FILE 1750
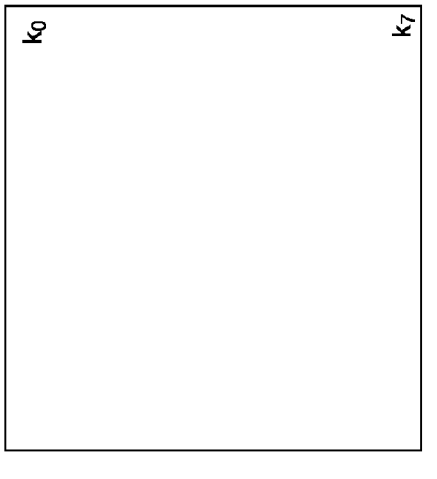
Write Mask Registers 1715
64 BITS
$k_0$ ... $k_7$
REGISTER ARCHITECTURE 1700
General Purpose Registers 1725
16 X 64 BITS
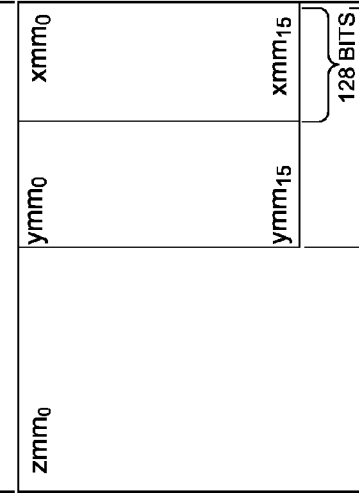
Vector Registers 1710
512 BITS
$zmm_0$ ... $zmm_{31}$
$ymm_0$ ... $ymm_{15}$
$xmm_0$ ... $xmm_{15}$
128 BITS
256 BITS

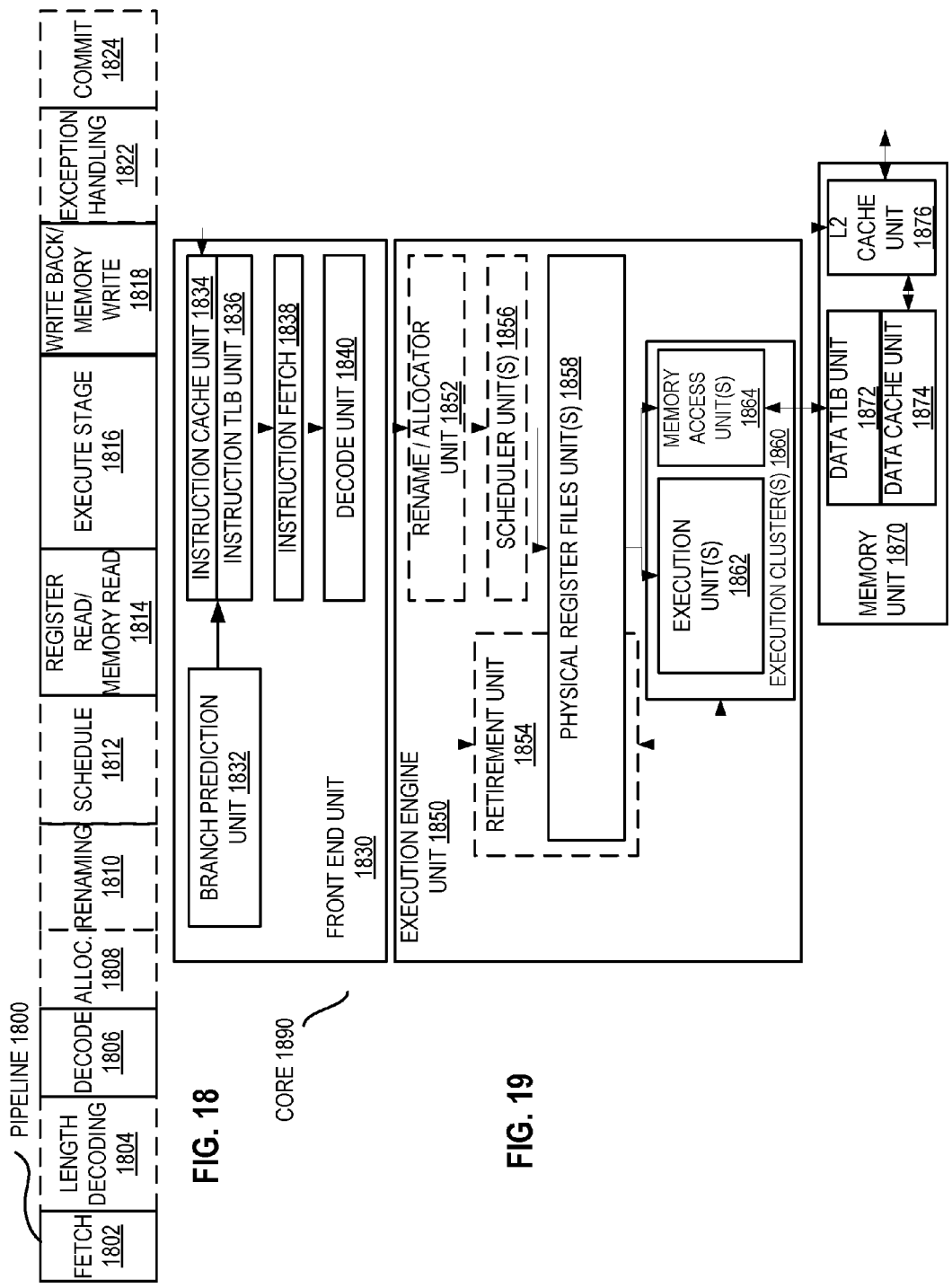

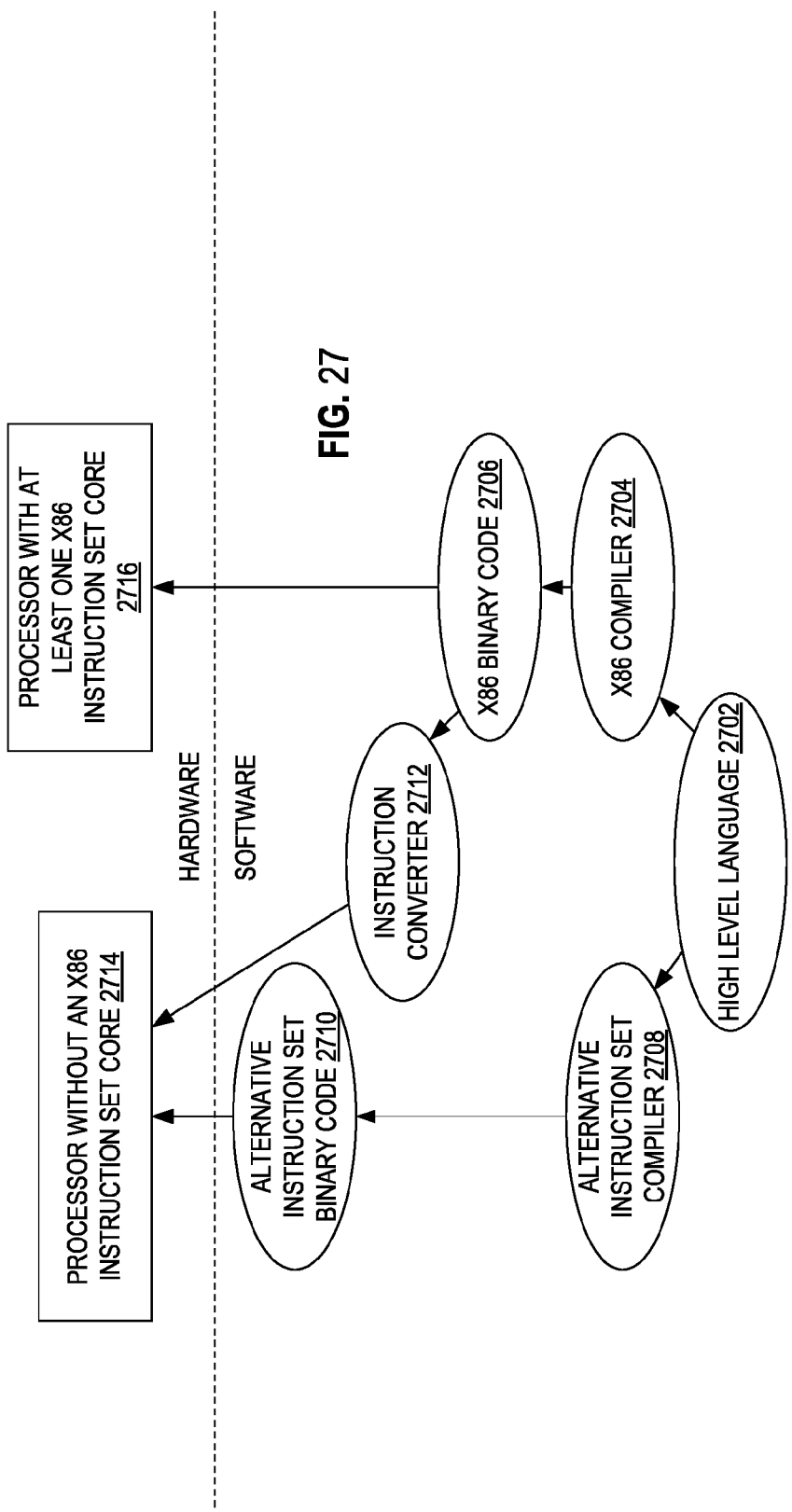

SYSTEM AND METHOD FOR EXECUTING AN INSTRUCTION TO PERMUTE A MASK

TECHNICAL FIELD

Embodiments described herein generally relate to processors. In particular, embodiments described herein generally relate to processors configured to execute an instruction to permute a mask.

BACKGROUND INFORMATION

Vectorized code refers to operations performed on multiple components of a vector at the same time. Vector or Single Instruction Multiple Data (SIMD) computing generally offers improved execution performance over scalar computing because it enables increased exploitation of the parallelism offered by vector or SIMD processors. However, Performance gains in valorization of loops in general purpose applications can be limited due to complex dynamic control flow. Compilers may not attempt to vectorize sparse branchy loops, especially when costly instructions such as gather and scatter are required for vectorization. For certain types of code, such as sparse and branchy loops, it is difficult to apply vectorization to achieve performance gains. What is needed, then, is an instruction to enable vectorization of certain types of code.

BRIEF DESCRIPTION OF THE DRAWINGS

FIG. 13 illustrates fields included in generic vector friendly instruction format 1100.

FIG. 14 is a block diagram illustrating the fields of the specific vector friendly instruction format 1300 that make up the full opcode field 1174 according to one embodiment.

FIG. 15 is a block diagram illustrating the fields of the specific vector friendly instruction format 1300 that make up the register index field 1144 according to one embodiment.

FIG. 17 is a block diagram of a register architecture 1700 according to one embodiment.

FIG. 18 is a block diagram illustrating both an exemplary in-order pipeline and an exemplary register renaming, out-of-order issue/execution pipeline according to embodiments.

FIG. 19 shows processor core 1890 including a front end unit 1830 coupled to an execution engine unit 1850, and both are coupled to a memory unit 1870.

FIG. 27 shows a block diagram contrasting the use of a software instruction converter to convert binary instructions in a source instruction set to binary instructions in a target instruction set according to embodiments.

DETAILED DESCRIPTION OF THE EMBODIMENTS

Masked loads and stores may be used to improve performance of certain types of code and code loops. An instruction to modify a mask is disclosed. The disclosed instruction allows permuting a mask to enable reads from and writes to correct locations. The disclosed instruction may be used to permute any operand, regardless of its size or intended use. Detailed below are embodiments of systems, apparatuses, and methods for mask permutation.

Figure 1:
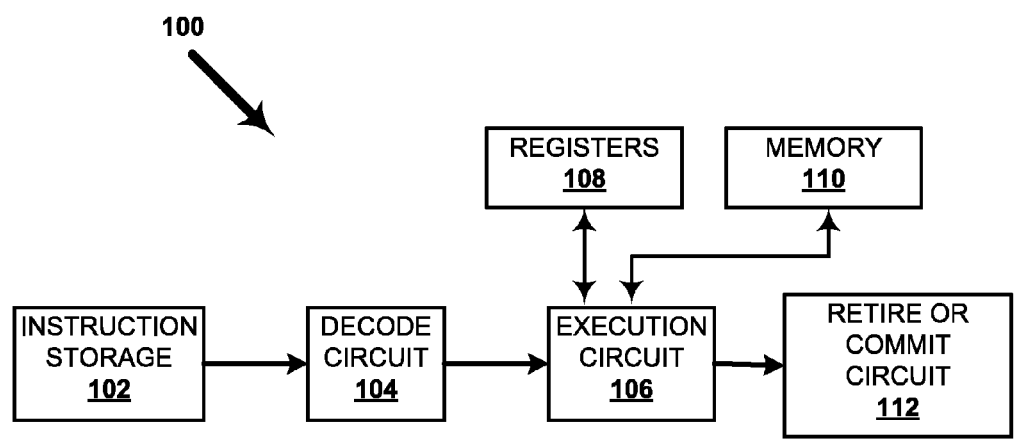
FIG. 1 is a block diagram 300 illustrating processing components for executing an instruction to permute a mask according to one embodiment.

FIG. 1 is a block diagram 100 illustrating processing components for executing an instruction to permute a mask according to one embodiment. Specifically, block diagram 100 includes instruction storage 102, decode circuit 104, execution circuit 106, registers 108, memory 110, and retire or commit circuit 112. An instruction is input from instruction storage 102, which comprises a cache memory, an on-chip memory, a memory on the same die as the processor, an instruction register, a general register, or system memory, without limitation. Decode circuit 104 decodes the instruction. In one embodiment, the instruction comprises fields discussed further below with respect to FIG. 2. The decoded instruction is executed by execution circuit 106. Execution circuit 106 is configured to read data from and write data to registers 108 and memory 110. Registers 108 comprise any one or more of a data register, an instruction register, a general register, an on-chip memory. Memory 110 comprises any of an on-chip memory, a memory on the same die as the processor, a memory in the same package as the processor, a cache memory, or system memory. Several exemplary embodiments of execution circuit 106 are described and illustrated with respect to FIGS. 6-10. Retire or commit circuit 112 ensures that execution results are written to or have been written to their destinations, and frees up or releases resources for later use.

Figure 2:
FIG. 2 illustrates fields included in an instruction to permute a mask according to one embodiment.

FIG. 2 illustrates fields included in an instruction to permute a mask according to one embodiment. Specifically, instruction 200 includes opcode 202, first source operand identifier 204, second source operand identifier 206, and destination operand identifier 208. Opcode 202 identifies the instruction and/or the operation to be performed, as well as the type of operands (e.g., instruction to permute a first source operand in a dedicated mask register, using a second source operand in a vector register, and to write the results to another dedicated mask register). The first source operand identifier 204 contains the first source operand (an immediate) or identifies a register or memory location from which to retrieve the first source operand. The first source operand comprises a plurality of elements, each of which has a corresponding element in a second source operand, specified by the second source operand identifier 206, and a corresponding element in a destination operand, specified by the destination operand identifier 208. In one embodiment, the first source operand is a mask register comprising settable bits, and the second source operand has corresponding indices that map each of the first source operand elements to one of the elements of the destination operand. Because the second source operand and the destination operand correspond to the first source operand, their minimum sizes depend on the size of the first source operand. For example, if the first source operand contains 8 elements, the destination operand will contain a minimum of 8 elements, and the second source operand will contain at least 8 indices, each a minimum of 3-bits wide to select one of the 8 elements of the destination operand. As another example, if the first source operand contains 64 elements, the destination operand will contain a minimum of 64 elements, and the second source operand will contain at least 64 corresponding indices, each a minimum of 8-bits wide to select one of the 64 elements of the destination operand.

The first and second source operands and the destination operands identified by fields 104, 106, and 108 are stored in registers of a register set or in memory. The register set is part of a register file, along with potentially other registers, such as status registers, flag registers, dedicated mask registers, vector registers, etc. In one embodiment, the registers are visible from the outside of the processor or from a programmer's perspective. In one embodiment, instructions specify operands stored in the registers. Various different types of registers are suitable, as long as they are capable of storing and providing data as described herein. Alternatively, one or more of the source and destination operands are stored in a storage location other than a register, such as, for example, a location in system memory.

Figure 3:
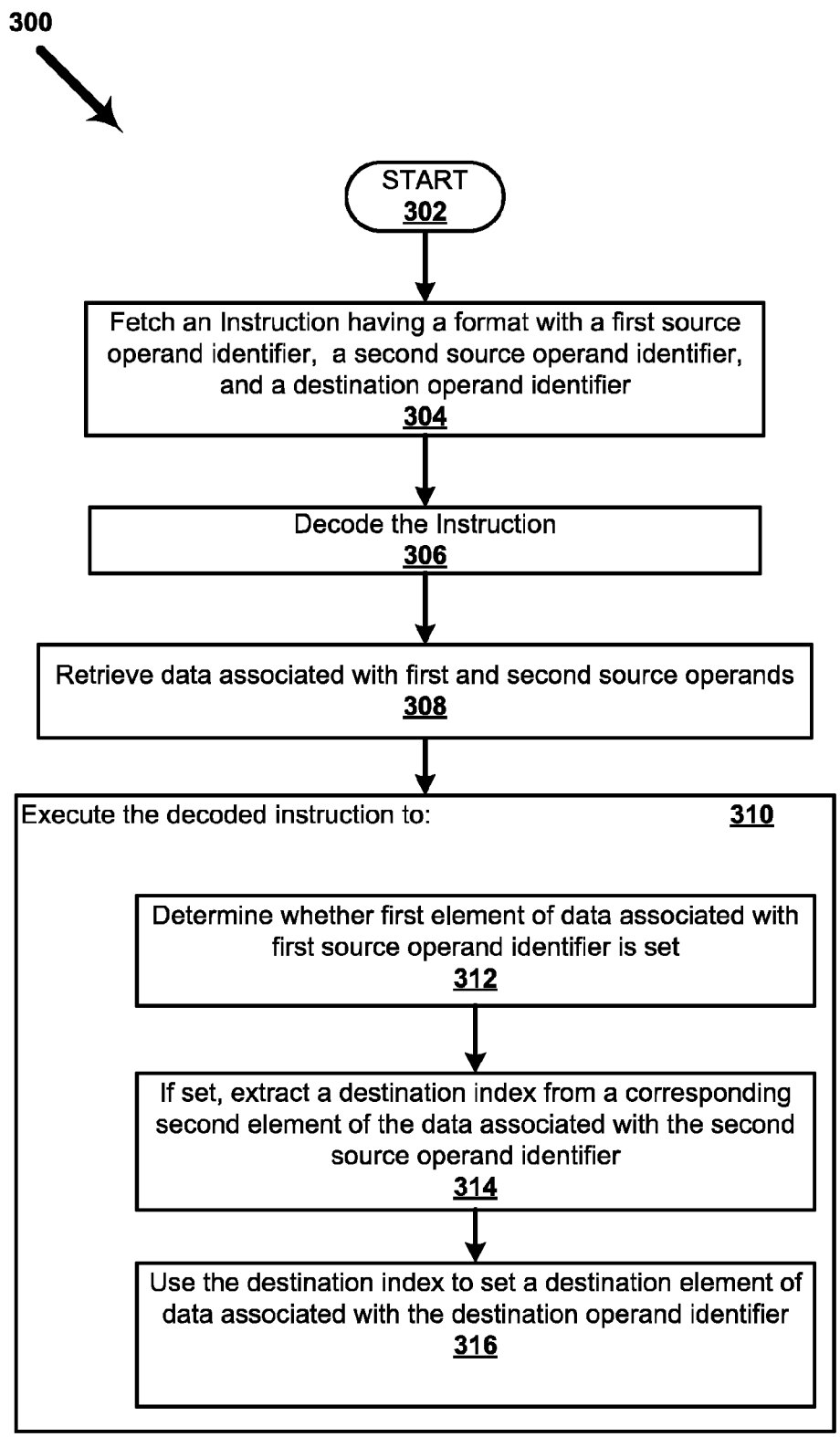
FIG. 3 is a block flow diagram illustrating execution of an instruction to permute a mask according to one embodiment.

FIG. 3 is a block flow diagram illustrating execution of an instruction to permute a mask according to one embodiment. Specifically, block flow diagram 300 includes starting at block 302, fetching an instruction at block 304, decoding the instruction at block 306, retrieving data associated with the first and second source operand identifiers at block 308, and executing the instruction at block 310. The instruction fetched at block 304 has a format with a first source operand identifier, a second source operand identifier, and a destination operand identifier. Fetching an instruction at block 304 is performed by fetching an instruction from instruction storage 102 (FIG. 1), which comprises a cache memory, an instruction register, a general register, or system memory. Decoding the instruction at block 306 includes decoding the various fields of the instruction (See FIG. 2), including the opcode 202, the first source operand identifier 204, the second source operand identifier 206, and the destination operand identifier 208. Decoding also includes determining from where to retrieve the operands and to where to write the results. The operands are stored in registers of a register set or in memory. The register set is part of a register file, along with potentially other registers, such as status registers, flag registers, dedicated mask registers, vector registers, etc. In one embodiment, the registers are visible from the outside of the processor or from a programmer's perspective. For example, instructions specify operands stored in the registers. Various different types of registers are suitable, as long as they are capable of storing and providing data as described herein. Alternatively, one or more of the source and destination operands is stored in a storage location other than a register, such as, for example, a location in system memory. Executing the instruction at block 310 includes determining whether a first element of data associated with the first source operand identifier is set at block 312, if it is set, extracting a destination index from a corresponding element of the data associated with the second source operand identifier at block 314, and using the destination index to set a destination element of data associated with the destination operand identifier at block 316. Execution block 310 is further described below with reference to FIGS. 6 to 10. In some embodiments, block flow diagram 300 is performed by and/or with processing components at illustrated in FIG. 1.

Figure 4:
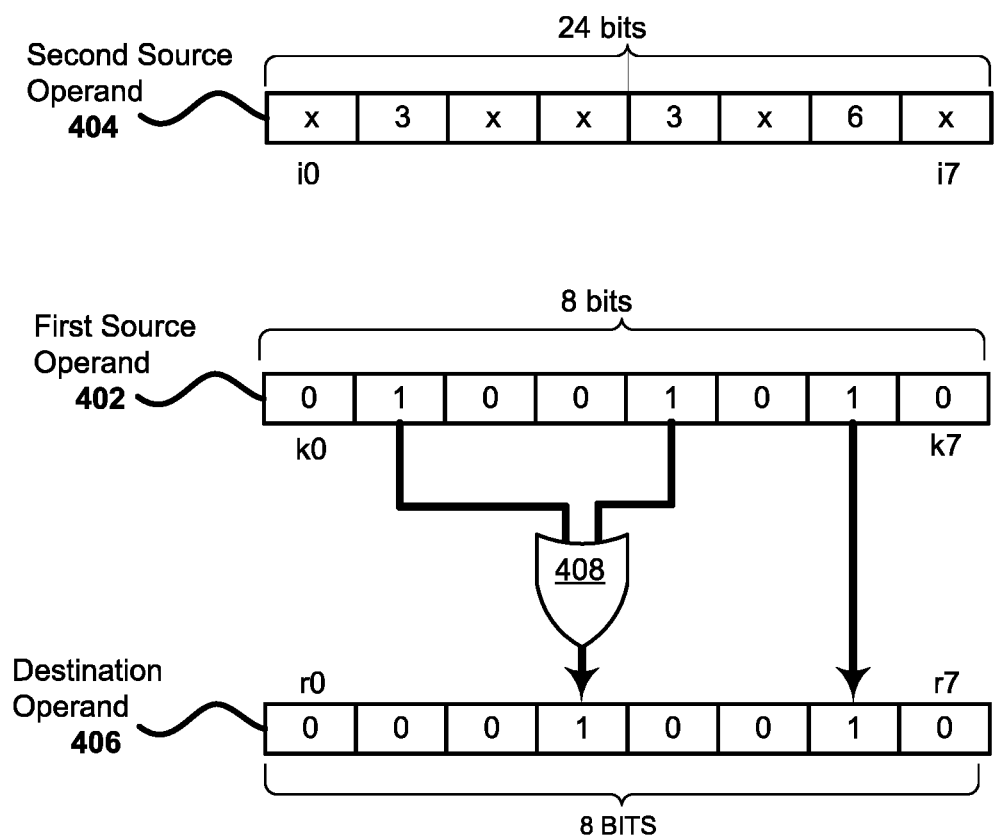
FIG. 4 illustrates a logic circuit used to set one element of a destination operand using a first source operand and a second source operand according to one embodiment.

FIG. 4 illustrates an exemplary result of executing an instruction to permute a mask according to the disclosure. Here, the first source operand identifier points to an 8-bit value 402, set to [k0:k7]=8'b010001010, and the second source operand identifier points to a 24-bit value 404, which includes 8 3-bit indices mapping each bit of the first source operand to one of the eight bits of the destination operand. As shown, the second source operand is set to [i0:i7]={x, 3, x, x, 3, x, 6, x}, mapping the three set (i.e. equal to '1') bits of the first source operand to bits 3, 3, and 6 of the destination operand. For illustration purposes, i0, i2, i3, i5, and i7 are set to 'x' because their values will not affect the results, as the corresponding bits of the first source operand are set to '0.' As shown, the destination operand register 406 in this example is set to 8'b00010010. Note that, as illustrated in FIG. 4, it is possible for more than one of the elements of the second source operand, i0 to i7, to have the same value, to thus map multiple elements of the first source operand to the same element of the destination operand. In this way, multiple elements of the first source operand, k0 to k7, can be mapped to the same element of the destination operand, r0 to r7. As shown in FIG. 4, bit k1 of the first source operand QD02 is set and corresponding element i1 of the second source operand 404 points to r3. But also, bit k4 of the first source operand QD02 is set and corresponding element i4 of the second source operand 404 also points to r3. Therefore, 2 inputs of OR gate 408 are set, setting destination bit r3. In the illustrated example, then, the first source operand contains more set elements than the destination operand.

Figure 5:
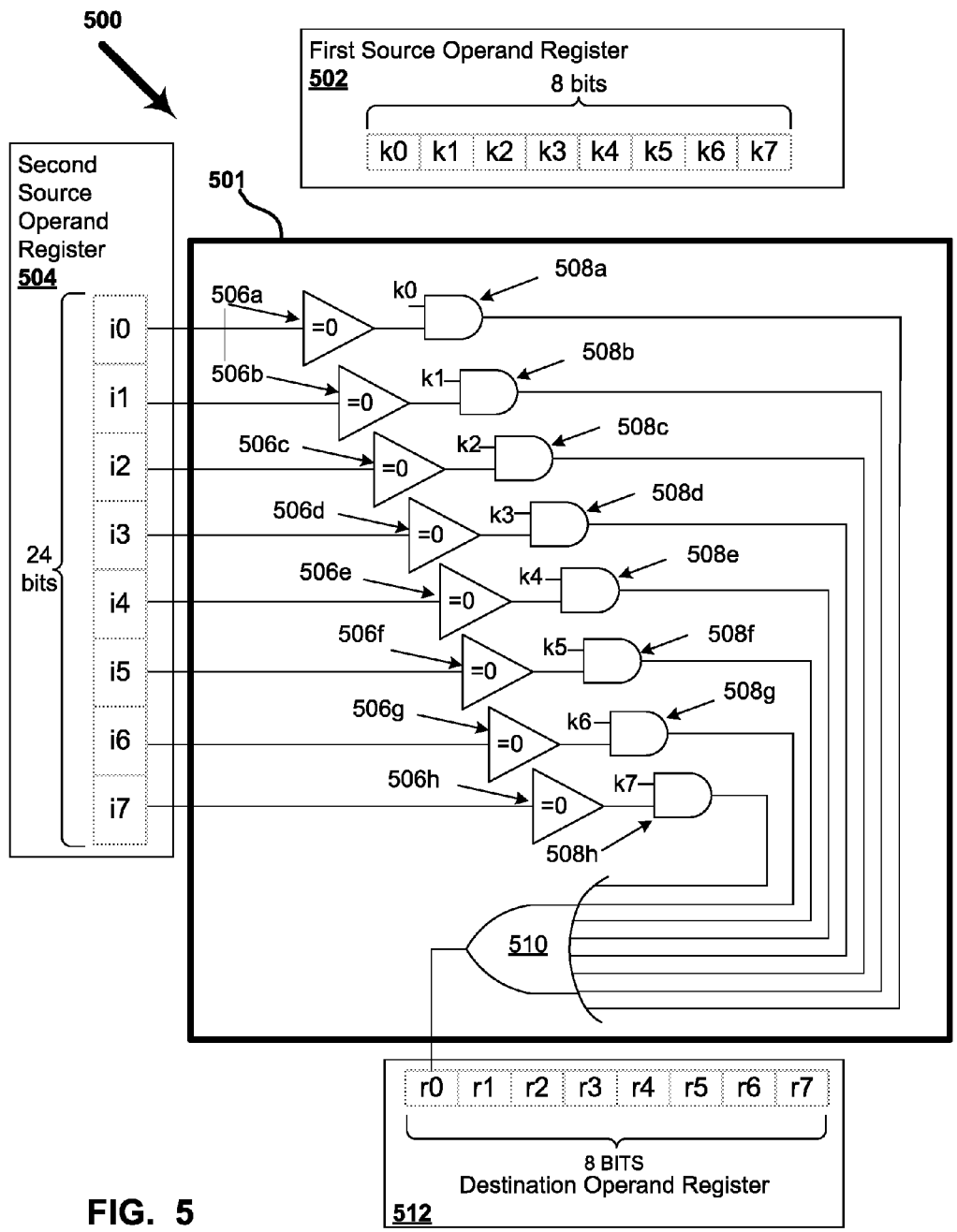
FIG. 5 illustrates a logic circuit used to set one element of a destination operand using a first source operand and a second source operand according to one embodiment.

FIG. 5 illustrates a logic circuit to set one element of a destination operand using a first source operand and a second source operand according to one embodiment. As shown, logic circuit 500 includes an 8-bit register 502 for holding a first source operand, a 24-bit register 504 for holding a second source operand, and an 8-bit register 512 for holding a destination operand. As shown, combinational logic 501 includes comparators 506a-h, AND gates 508a-h, and 8-input OR gate 510. As illustrated, register 504 holds element i0 of the second source operand, which corresponds to element k0 of the first source operand. In operation, if k0 is set and i0 is equal to 000, the output of AND gate 508a will be set, causing the output of OR gate 510 to be set, and for element r0 of register 512 to be set. Similarly, if k1 is set and i1 equals 000, the output of AND gate 508b will be set, causing OR gate 510 to be set, and for element r0 of register 512 to be set. Similarly, if k2 is set and i2 equals 000, or if k3 is set and i3 equals 000, or if k4 is set and i4 equals 000, and so on, the output of OR gate Q'10 will be set and element r0 of the destination operand stored in register 512 will be set.

For simplicity, the circuit 500 as illustrated in FIG. 5 is only shown to process one of the eight elements of the destination operand register. More circuitry could be used to set more or all of the elements in parallel. Alternatively, the illustrated logic circuit could be used serially to set one element of the destination operand at a time.

Figure 6:
FIG. 6 is pseudocode to illustrate operation of an execution circuit 106 (FIG. 1) according to one embodiment.

FIG. 6 is pseudocode to illustrate operation of execution circuit 106 (FIG. 1) according to one embodiment. As shown, the pseudocode illustrates that exemplary execution circuit 106 (FIG. 1) receives as inputs a 16-bit first source operand identifier, src1, a 64-bit second source operand identifier, src2, and a 16-bit destination operand identifier, dest. The exemplary execution circuit 106 (FIG. 1), as illustrated by the pseudocode of FIG. 6, clears the data associated with the destination operand identifier, dest. The exemplary execution circuit 106 (FIG. 1), as illustrated by the pseudocode of FIG. 6, processes the sixteen bits of src1, and for each bit that is set, extracts a destination index associated with the element from a corresponding element of the data associated with the second source operand identifier, src2; and uses the destination index to set an element of the data associated with the destination operand identifier, dest. The exemplary execution circuit 106 (FIG. 1) can process the bits one at a time, serially, or can process multiple bits, or all bits, at the same time in parallel.

Figure 7:
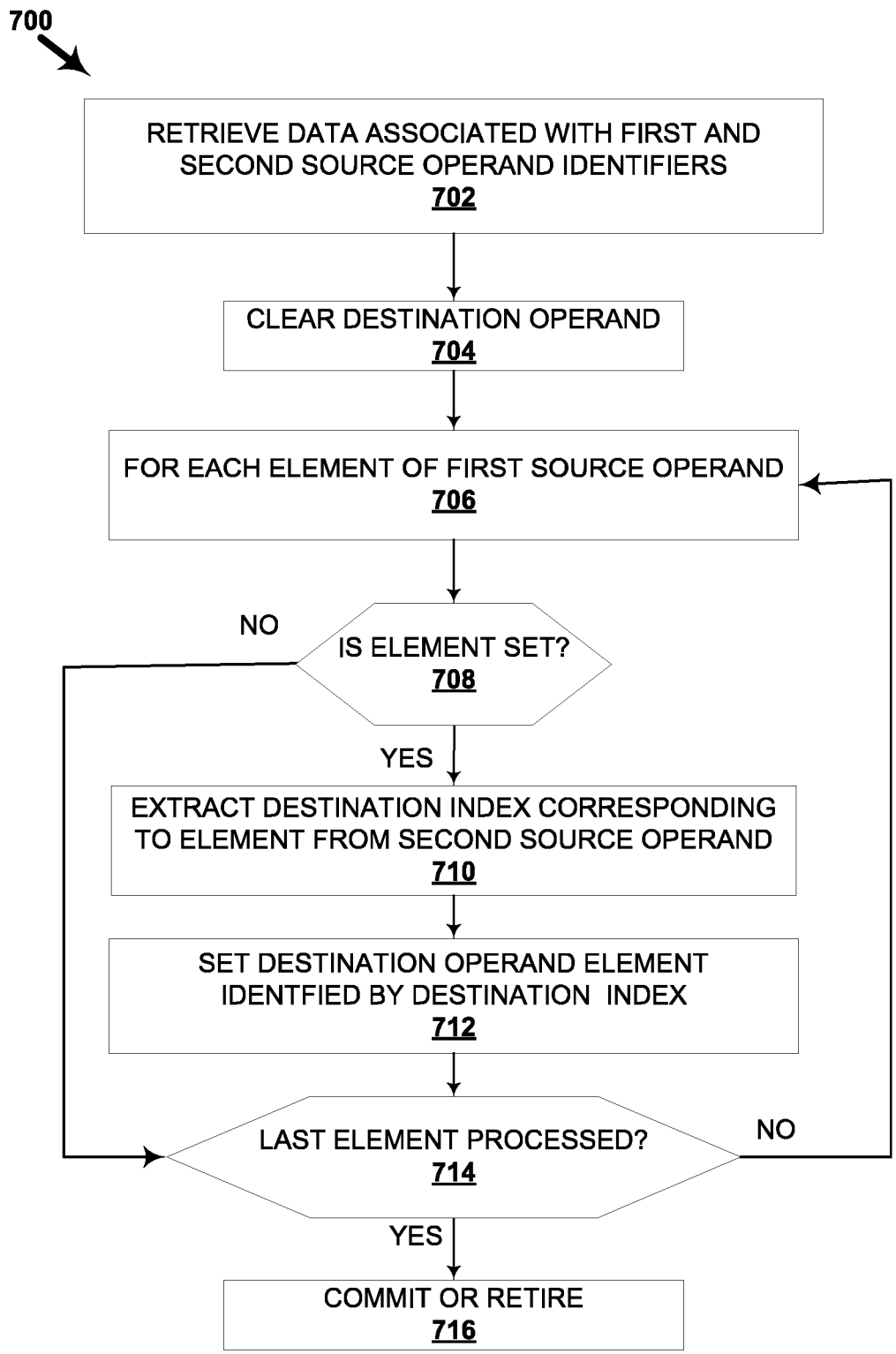
FIG. 7 is a block flow diagram illustrating operation of an execution circuit 106 (FIG. 1) according to one embodiment.

FIG. 7 is a block flow diagram illustrating operation of execution circuit 106 (FIG. 1) according to one embodiment. Specifically, the execution circuit 106 retrieves data associated with first and second source operand identifiers at 702, clears a destination operand at 704, tests, at 706, for each element of the first source operand, whether the first source operand element is set at 708, and if it is not set, proceeds to 714 to test whether the last element of the first source operand has been processed. But if the execution circuit 106 determines at 708 that the first source operand element is set, it continues by extracting a destination index corresponding to the first source operand element from a corresponding element of the second source operand at 710, sets the destination element identified by the destination index at 712, and determines whether the last element of the first source operand has been processed at 714. If it determines at 714 that the last element of the first source operand has been processed, execution circuit 106 continues to commit or retire the instruction at 716. Otherwise, at 706, it processes the next element of the first source operand.

Executing the instruction to permute a mask, as shown in FIG. 7, occurs substantially serially, processing one element of the first source operand at a time. In some embodiments, the flow shown in FIG. 7 is performed by and/or with processing components at illustrated in FIG. 1.

Figure 8:
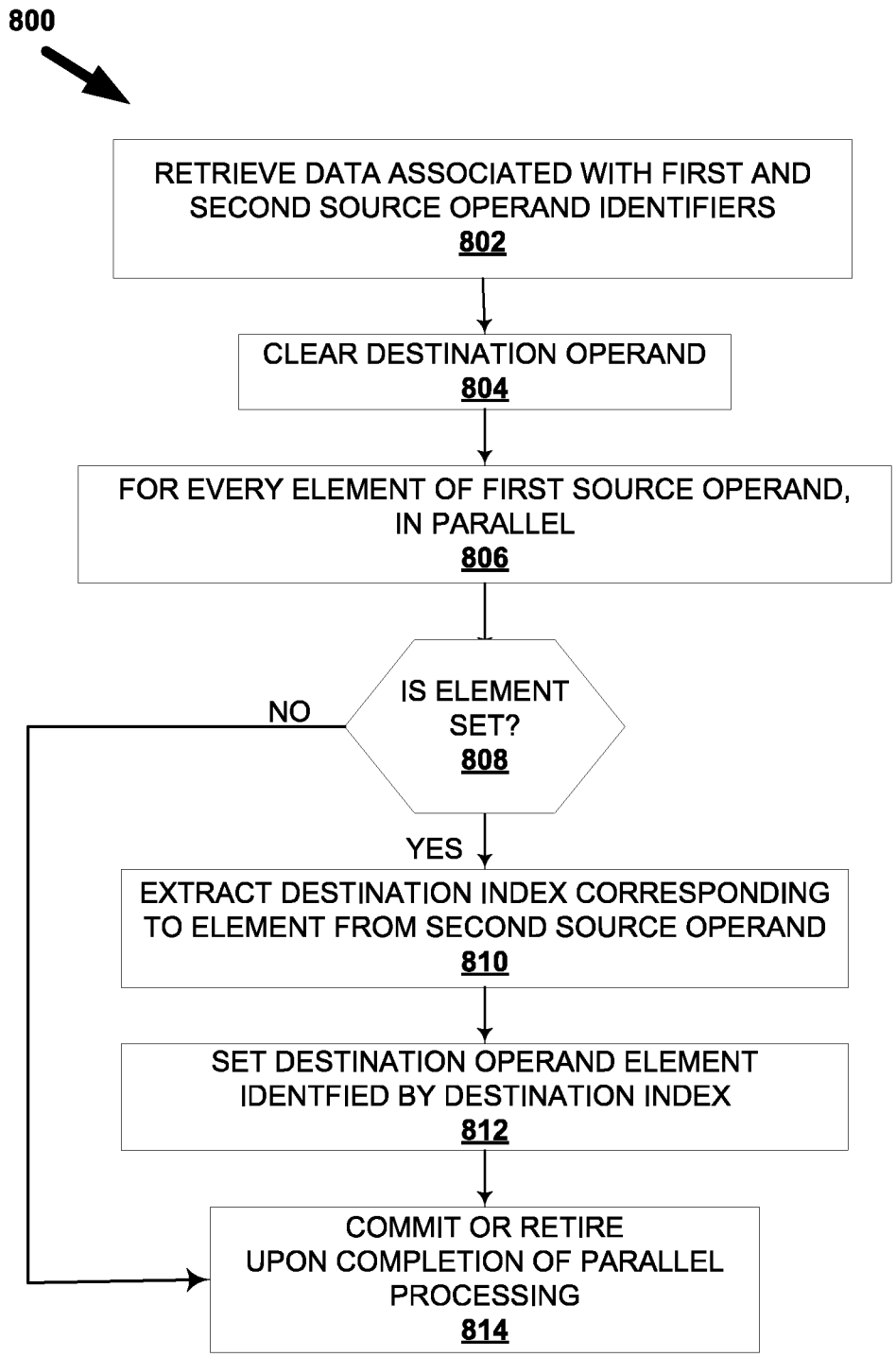
FIG. 8 is a block flow diagram illustrating operation of execution circuit 106 (FIG. 1) according to an alternate embodiment.

FIG. 8 is a block flow diagram illustrating operation of execution circuit 106 (FIG. 1) according to an alternate embodiment. Specifically, the execution circuit 106 retrieves data associated with first and second source operand identifiers at 802, and clears a destination operand at 804. At 806, in parallel for every element of the first source operand, execution circuit 106 tests whether the first source operand element is set at 808, and if it is not set, commits or retires the instruction at 814 once parallel processing of all elements of the first source operand has been completed. But if execution circuit 106 determines at 808 that the first source operand element is set, it extracts a destination index from a corresponding element of the second source operand at 810, sets the destination element identified by the destination index at 812, then at 814 commits or retires the instruction once parallel processing of all elements of the first source operand has been completed.

Execution of the instruction to permute a mask, as shown in FIG. 8, occurs substantially in parallel, processing every element of the first source operand at the same time. In some embodiments, flow diagram 800 is performed by and/or with processing components at illustrated in FIG. 1.

Figure 9:
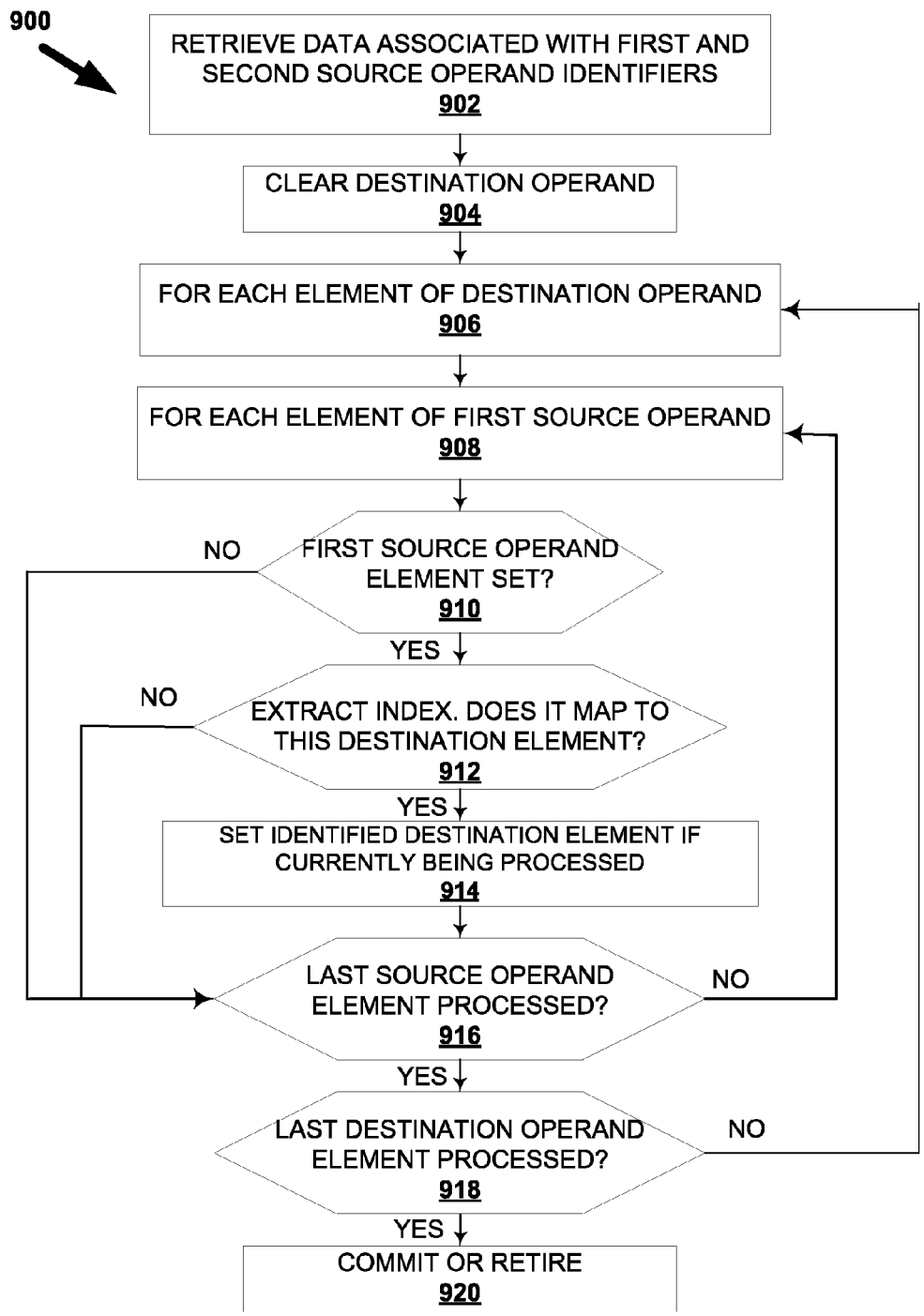
FIG. 9 is a block flow diagram illustrating operation of execution circuit 106 (FIG. 1) according to an alternate embodiment.

FIG. 9 is a flow diagram illustrating operation of execution circuit 106 (FIG. 1) according to an alternate embodiment. Specifically, the execution circuit 106 retrieves data associated with first and second source operand identifiers at 902, clears a destination operand at 904, allocates logic to process each element of the destination operand at 906, during which it allocates logic to process each element of the first source operand at 908, during which it tests whether the first source operand element is set at 910, and if it is not set, proceeds to 916 to test whether the last element of the first source operand has been processed. But if execution circuit 106 determines at 910 that the element is set, it extracts a destination index corresponding to the first source operand element from a corresponding element of the second source operand at 912, and determines whether that destination index points to the destination element selected earlier at Q'106. If the destination index does not point to the selected destination element, execution circuit 106 at 916 determines whether the last element of the first source operand has been processed, otherwise, if the destination index does point to the destination element selected at 906, execution circuit 106 at 914 sets the destination operand element identified by the destination index, and determines whether the last element of the first source operand has been processed at 916. If execution circuit 106 determines at 916 that the last element of the first source operand has been processed, it tests at 918 whether the last element of the destination operand has been processed, and, otherwise, returns to Q'108 to select the next element of the first source operand. At 918, if execution circuit 106 determines that the last element of the destination operand has not been processed, it returns to 906 to select the next element of the destination operand. If execution circuit 106 determines at 918 that the last element of the destination operand has been processed, it commits or retires the instruction at 920.

Execution of the instruction to permute a mask, as shown in FIG. 9, occurs substantially serially, processing one element of the destination operand and the first source operand at a time. In some embodiments, flow diagram 900 is performed by and/or with processing components at illustrated in FIG. 1.

Figure 10:
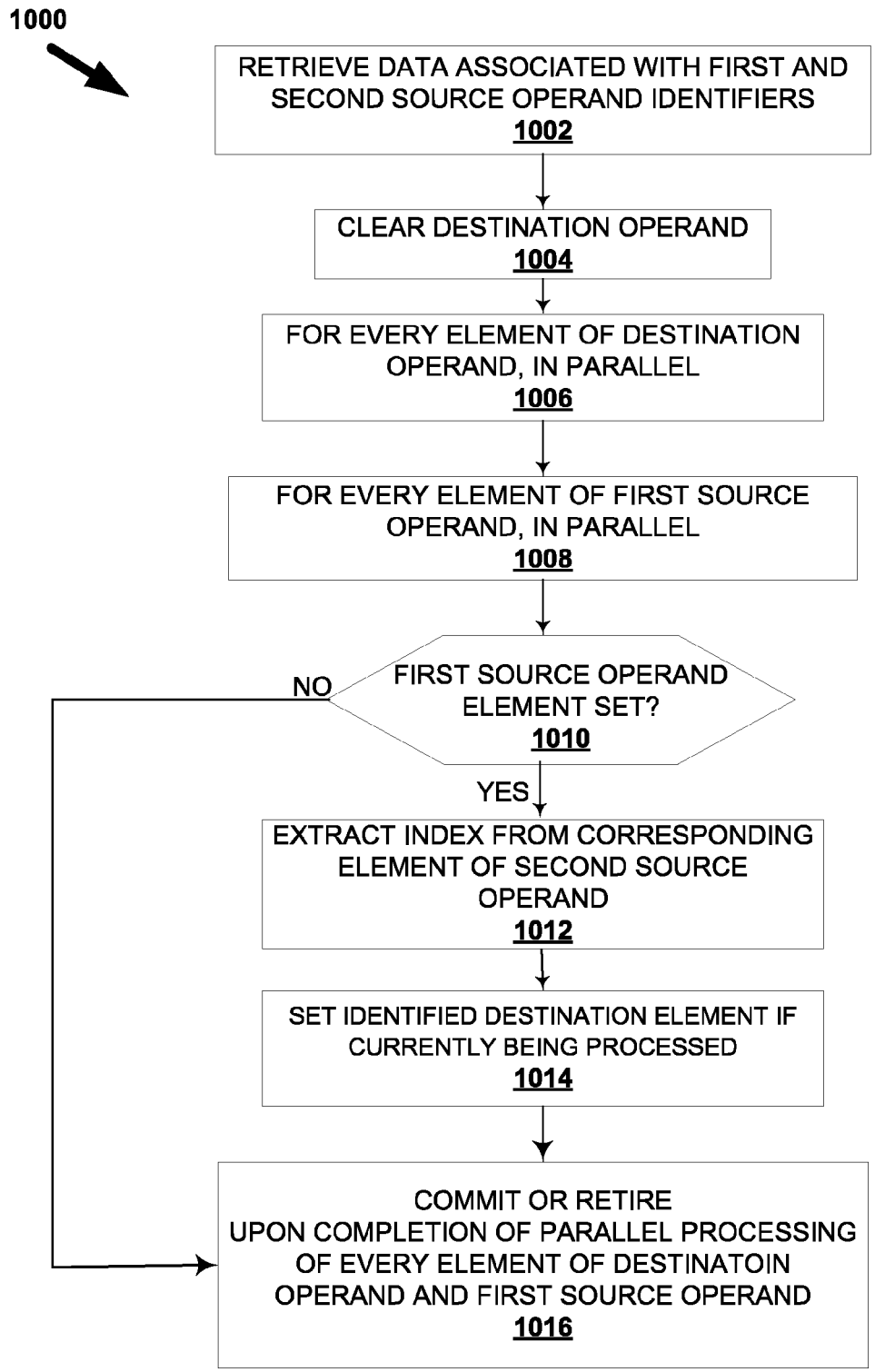
FIG. 10 is a block flow diagram illustrating operation of execution circuit 106 (FIG. 1) according to an alternate embodiment.

FIG. 10 is a flow diagram illustrating operation of execution circuit 106 (FIG. 1) according to an alternate embodiment. Specifically, execution circuit 106 retrieves data associated with first and second source operand identifiers at 1002, clears a destination operand at 1004, uses parallel circuitry at 1006 to process every element of the destination operand, and for each element of the destination operand uses parallel circuitry at 1008 to process every element of the first source operand, and for each element of the first source operand, execution circuit 106 determines at 1010 whether the first source operand element is set, and if it is not set, it commits or retires the instruction once all parallel processes are completed at 1016. But if execution circuit 106 determines at 1010 that the first source operand element is set, it extracts a destination index corresponding to the first source operand element from a corresponding element of the second source operand at 1012, sets the destination element identified by that index at 1014 if the identified destination element matches the destination index being processed by the circuit allocated at 1006, and commits or retires the instruction at 1016 once all parallel processes are completed.

Execution of the instruction to permute a mask, as shown in FIG. 10, occurs substantially in parallel, processing every element of the destination operand and the first source operand at the same time. In some embodiments, flow diagram 1000 is performed by and/or with processing components as illustrated in FIG. 1.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11:
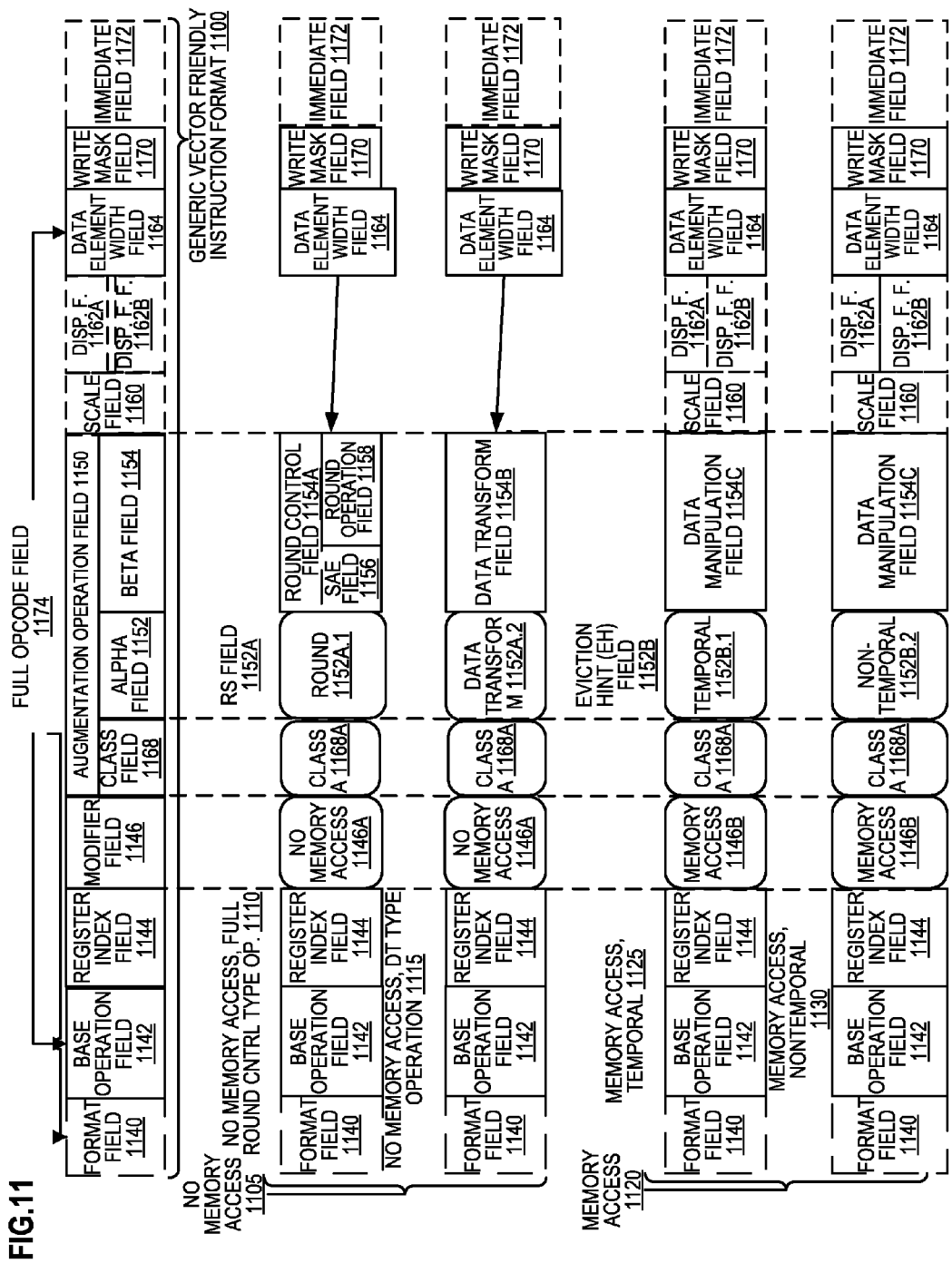
FIG. 11 is a block diagram illustrating a generic vector friendly instruction format and class A instruction templates thereof according to embodiments.
Figure 12:
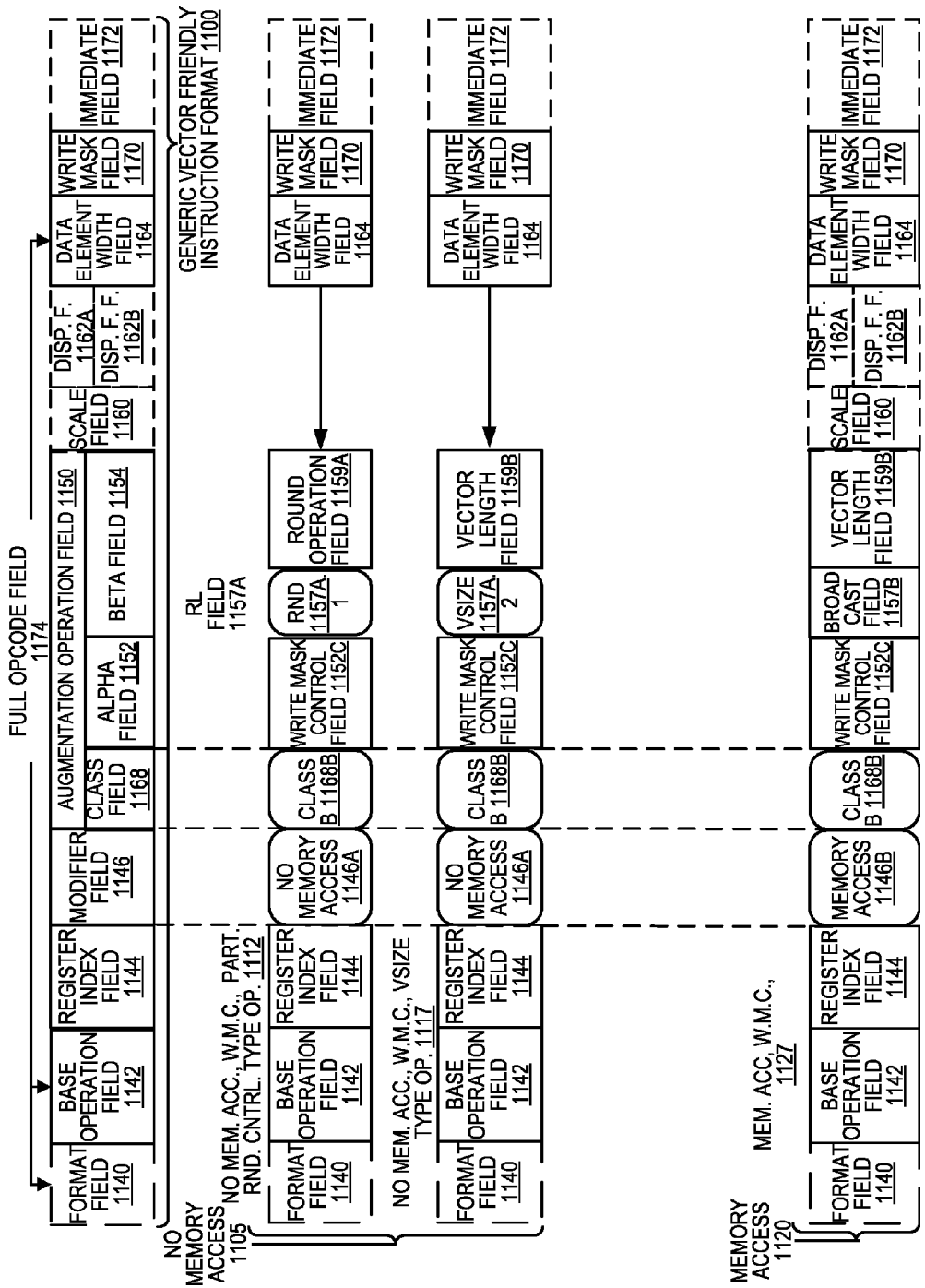
FIG. 12 is a block diagram illustrating the generic vector friendly instruction format and class B instruction templates thereof according to embodiments.

FIGS. 11-12 are block diagrams illustrating a generic vector friendly instruction format and instruction templates thereof according to embodiments. FIG. 11 is a block diagram illustrating a generic vector friendly instruction format and class A instruction templates thereof according to embodiments of the invention; while FIG. 12 is a block diagram illustrating the generic vector friendly instruction format and class B instruction templates thereof according to embodiments. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11 include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 12 include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11-12.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, and 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*\text{index}+\text{base}$).

Displacement Field 1162A—its content is used as part of memory address generation (e.g., for address generation that uses $2^{scale}*\text{index}+\text{base}+\text{displacement}$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11-B, the contents of this field select between class A and class B instructions. In FIGS. 11-B, rounded corner squares are used to indicate a specific value is present in a field (e.g., class A 1168A and class B 1168B for the class field 1168 respectively in FIGS. 11-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the invention where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the invention where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13 is a block diagram illustrating an exemplary specific vector friendly instruction format according to embodiments. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 13 map are illustrated.

It should be understood that, although embodiments of the invention are described with reference to the specific vector friendly instruction format 1300 in the context of the generic vector friendly instruction format 1100 for illustrative purposes, the invention is not limited to the specific vector friendly instruction format 1300 except where claimed. For example, the generic vector friendly instruction format 1100 contemplates a variety of possible sizes for the various fields, while the specific vector friendly instruction format 1300 is shown as having fields of specific sizes. By way of specific example, while the data element width field 1164 is illustrated as a one bit field in the specific vector friendly instruction format 1300, the invention is not so limited (that is, the generic vector friendly instruction format 1100 contemplates other sizes of the data element width field 1164).

The generic vector friendly instruction format 1100 includes the following fields listed below in the order illustrated in FIG. 13.

EVEX Prefix (Bytes 0-3) 1302—is encoded in a four-byte form.

Format Field 1140 (EVEX Byte 0, bits [7:0])—the first byte (EVEX Byte 0) is the format field 1140 and it contains 0×62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of an EVEX.R bit field (EVEX Byte 1, bit [7]—R), EVEX.X bit field (EVEX byte 1, bit [6]—X), and 1157BEX byte 1, bit [5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv) the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1 s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also known as EVEX.EH, EVEX.rs, EVEX.RL, EVEX. write mask control, and EVEX.N; also illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1354 and SIB.bbb 1356—the contents of these fields have been previously referred to with regard to the register indexes Xxxx and Bbbb.

Displacement field 1162A (Bytes 7-10)—when MOD field 1342 contains 10, bytes 7-10 are the displacement field 1162A, and it works the same as the legacy 32-bit displacement (disp32) and works at byte granularity.

Displacement factor field 1162B (Byte 7)—when MOD field 1342 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 14 is a block diagram illustrating the fields of the specific vector friendly instruction format 1300 that make up the full opcode field 1174 according to one embodiment. Specifically, the full opcode field 1174 includes the format field 1140, the base operation field 1142, and the data element width (W) field 1164. The base operation field 1142 includes the prefix encoding field 1325, the opcode map field 1315, and the real opcode field 1330.

Register Index Field

FIG. 15 is a block diagram illustrating the fields of the specific vector friendly instruction format 1300 that make up the register index field 1144 according to one embodiment. Specifically, the register index field 1144 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 16:
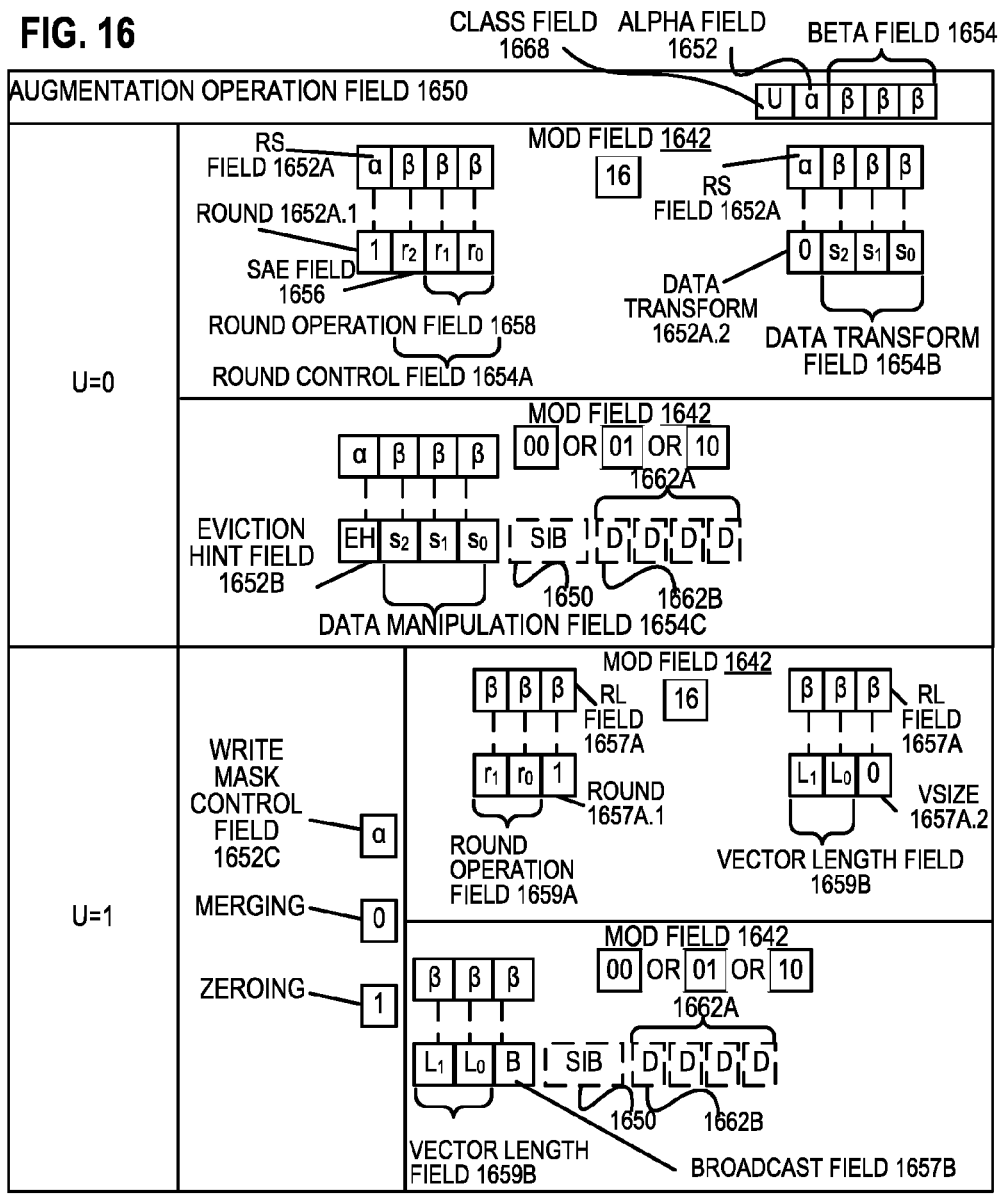
FIG. 16 is a block diagram illustrating the fields of the specific vector friendly instruction format that makes up the augmentation operation field 1650 according to one embodiment.

FIG. 16 is a block diagram illustrating the fields of the specific vector friendly instruction format 1300 that make up the augmentation operation field 1650 according to one embodiment. When the class (U) field 1668 contains 0, it signifies EVEX.U0 (class A 1668A); when it contains 1, it signifies EVEX.U1 (class B 1668B). When U=0 and the MOD field 1642 contains 16 (signifying a no memory access operation), the alpha field 1652 (EVEX byte 3, bit [7]—EH) is interpreted as the RS field 1652A. When the RS field 1652A contains a 1 (round 1652A.1), the beta field 1654 (EVEX byte 3, bits [6:4]—SSS) is interpreted as the round control field 1654A. The round control field 1654A includes a one bit SAE field 1656 and a two bit round operation field 1658. When the RS field 1652A contains a 0 (data transform 1652A.2), the beta field 1654 (EVEX byte 3, bits [6:4] SSS) is interpreted as a three bit data transform field 1654B. When U=0 and the MOD field 1342 contains 00, 01, or 10 (signifying a memory access operation), the alpha field 1652 (EVEX byte 3, bit [7]—EH) is interpreted as the eviction hint (EH) field 1652B and the beta field 1654 (EVEX byte 3, bits [6:4] SSS) is interpreted as a three bit data manipulation field 1654C.

When U=1, the alpha field 1652 (EVEX byte 3, bit [7]—EH) is interpreted as the write mask control (Z) field 1652C. When U=1 and the MOD field 1342 contains 16 (signifying a no memory access operation), part of the beta field 1654 (EVEX byte 3, bit [4]—$S_0$) is interpreted as the RL field 1657A; when it contains a 1 (round 1657A.1) the rest of the beta field 1654 (EVEX byte 3, bit [6-5]—$S_{2-1}$) is interpreted as the round operation field 1659A, while when the RL field 1657A contains a 0 (VSIZE 1657.A2) the rest of the beta field 1654 (EVEX byte 3, bit [6-5]—$S_{2-1}$) is interpreted as the vector length field 1659B (EVEX byte 3, bit [6-5]—$L_{1-0}$). When U=1 and the MOD field 1342 contains 00, 01, or 10 (signifying a memory access operation), the beta field 1654 (EVEX byte 3, bits [6:4]—SSS) is interpreted as the vector length field 1659B (EVEX byte 3, bit [6-5]—$L_{1-0}$) and the broadcast field 1657B (EVEX byte 3, bit [4]—B).

Exemplary Register Architecture

FIG. 17 is a block diagram of a register architecture 1700 according to one embodiment. In the embodiment illustrated, there are 32 vector registers 1710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1159B | A (FIG. 11; U = 0) | 1110, 1115, 1125, 1130 | zmm registers (the vector length is 64 byte) |
| | B (FIG. 12; U = 1) | 1112 | zmm registers (the vector length is 64 byte) |
| Instruction templates that do include the vector length field 1159B | B (FIG. 12; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1715—in the embodiment illustrated, there are 8 write mask registers (k0 through k7), each 64 bits in size. In an alternate embodiment, the write mask registers 1715 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1745, on which is aliased the MMX packed integer flat register file 1750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 18 is a block diagram illustrating both an exemplary in-order pipeline and an exemplary register renaming, out-of-order issue/execution pipeline according to embodiments. FIG. 19 is a block diagram illustrating both an exemplary embodiment of an in-order architecture core and an exemplary register renaming, out-of-order issue/execution architecture core to be included in a processor according to embodiments. The solid lined boxes in FIGS. 18 and 19 illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18, a processor pipeline 1800 includes a fetch stage 1802, a length decode stage 1804, a decode stage 1806, an allocation stage 1808, a renaming stage 1810, a scheduling (also known as a dispatch or issue) stage 1812, a register read/memory read stage 1814, an execute stage 1816, a write back/memory write stage 1818, an exception handling stage 1822, and a commit stage 1824.

FIG. 19 shows processor core 1890 including a front end unit 1830 coupled to an execution engine unit 1850, and both are coupled to a memory unit 1870. The core 1890 may be a reduced instruction set computing (RISC) core, a complex instruction set computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front end unit 1830 includes a branch prediction unit 1832 coupled to an instruction cache unit 1834, which is coupled to an instruction translation lookaside buffer (TLB) 1836, which is coupled to an instruction fetch unit 1838, which is coupled to a decode unit 1840. The decode unit 1840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1890 includes a microcode ROM or other medium that stores microcode for certain macroinstructions (e.g., in decode unit 1840 or otherwise within the front end unit 1830). The decode unit 1840 is coupled to a rename/allocator unit 1852 in the execution engine unit 1850.

The execution engine unit 1850 includes the rename/allocator unit 1852 coupled to a retirement unit 1854 and a set of one or more scheduler unit(s) 1856. The scheduler unit(s) 1856 represents any number of different schedulers, including reservations stations, central instruction window, etc. The scheduler unit(s) 1856 is coupled to the physical register file(s) unit(s) 1858. Each of the physical register file(s) units 1858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1858 comprises a vector registers unit, a write mask registers unit, and a scalar registers unit. These register units may provide architectural vector registers, vector mask registers, and general purpose registers. The physical register file(s) unit(s) 1858 is overlapped by the retirement unit 1854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1854 and the physical register file(s) unit(s) 1858 are coupled to the execution cluster(s) 1860. The execution cluster(s) 1860 includes a set of one or more execution units 1862 and a set of one or more memory access units 1864. The execution units 1862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1856, physical register file(s) unit(s) 1858, and execution cluster(s) 1860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1864). It should also be understood that where separate pipelines are used, one or more of these pipelines may be out-of-order issue/execution and the rest in-order.

The set of memory access units 1864 is coupled to the memory unit 1870, which includes a data TLB unit 1872 coupled to a data cache unit 1874 coupled to a level 2 (L2) cache unit 1876. In one exemplary embodiment, the memory access units 1864 may include a load unit, a store address unit, and a store data unit, each of which is coupled to the data TLB unit 1872 in the memory unit 1870. The instruction cache unit 1834 is further coupled to a level 2 (L2) cache unit 1876 in the memory unit 1870. The L2 cache unit 1876 is coupled to one or more other levels of cache and eventually to a main memory.

By way of example, the exemplary register renaming, out-of-order issue/execution core architecture may implement the pipeline 1800 as follows: 1) the instruction fetch 1838 performs the fetch and length decoding stages 1802 and 1804; 2) the decode unit 1840 performs the decode stage 1806; 3) the rename/allocator unit 1852 performs the allocation stage 1808 and renaming stage 1810; 4) the scheduler unit(s) 1856 performs the schedule stage 1812; 5) the physical register file(s) unit(s) 1858 and the memory unit 1870 perform the register read/memory read stage 1814; the execution cluster 1860 perform the execute stage 1816; 6) the memory unit 1870 and the physical register file(s) unit(s) 1858 perform the write back/memory write stage 1818; 7) various units may be involved in the exception handling stage 1822; and 8) the retirement unit 1854 and the physical register file(s) unit(s) 1858 perform the commit stage 1824.

The core 1890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1834/1874 and a shared L2 cache unit 1876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 21:
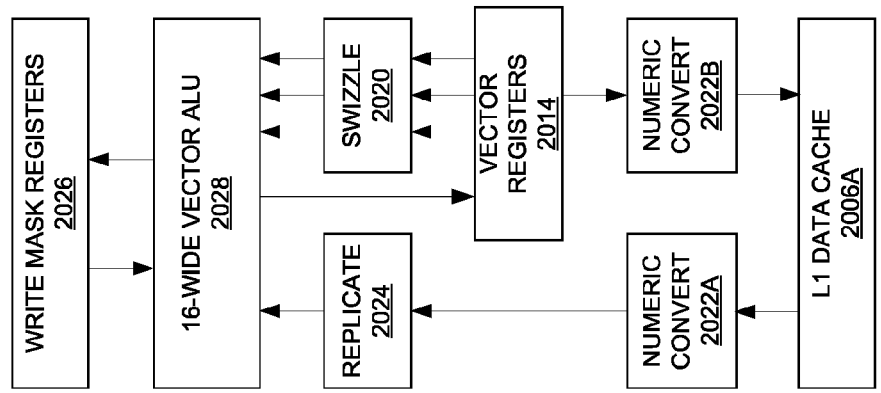
FIG. 21 is an expanded view of part of the processor core in FIG. 20 according to embodiments.
Figure 20:
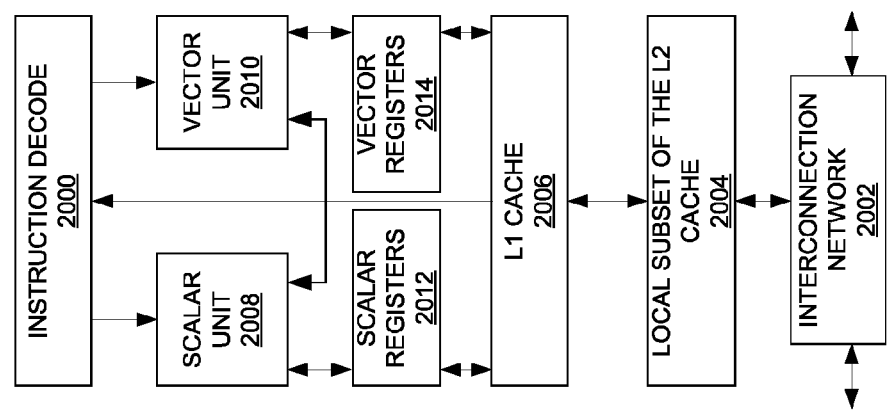
FIG. 20 is a block diagram of a single processor core, along with its connection to the on-die interconnect network 2002 and with its local subset of the Level 2 (L2) cache 2004, according to embodiments.

FIGS. 20 and 21 illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 20 is a block diagram of a single processor core, along with its connection to the on-die interconnect network 2002 and with its local subset of the Level 2 (L2) cache 2004, according to embodiments. In one embodiment, an instruction decoder 2000 supports the x86 instruction set with a packed data instruction set extension. An L1 cache 2006 allows low-latency accesses to cache memory into the scalar and vector units. While in one embodiment (to simplify the design), a scalar unit 2008 and a vector unit 2010 use separate register sets (respectively, scalar registers 2012 and vector registers 2014) and data transferred between them is written to memory and then read back in from a level 1 (L1) cache 2006, alternative embodiments of the invention may use a different approach (e.g., use a single register set or include a communication path that allow data to be transferred between the two register files without being written and read back).

The local subset of the L2 cache 2004 is part of a global L2 cache that is divided into separate local subsets, one per processor core. Each processor core has a direct access path to its own local subset of the L2 cache 2004. Data read by a processor core is stored in its L2 cache subset 2004 and can be accessed quickly, in parallel with other processor cores accessing their own local L2 cache subsets. Data written by a processor core is stored in its own L2 cache subset 2004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 21 is an expanded view of part of the processor core in FIG. 20 according to embodiments. FIG. 21 includes an L1 data cache 2006A part of the L1 cache 2006, as well as more detail regarding the vector unit 2010 and the vector registers 2014. Specifically, the vector unit 2010 is a 16-wide vector processing unit (VPU) (see the 16-wide ALU 2028), which executes one or more of integer, single-precision float, and double-precision float instructions. The VPU supports swizzling the register inputs with swizzle unit 2020, numeric conversion with numeric convert units 2022A-B, and replication with replication unit 2024 on the memory input. Write mask registers 2026 allow predicating resulting vector writes.

Figure 22:
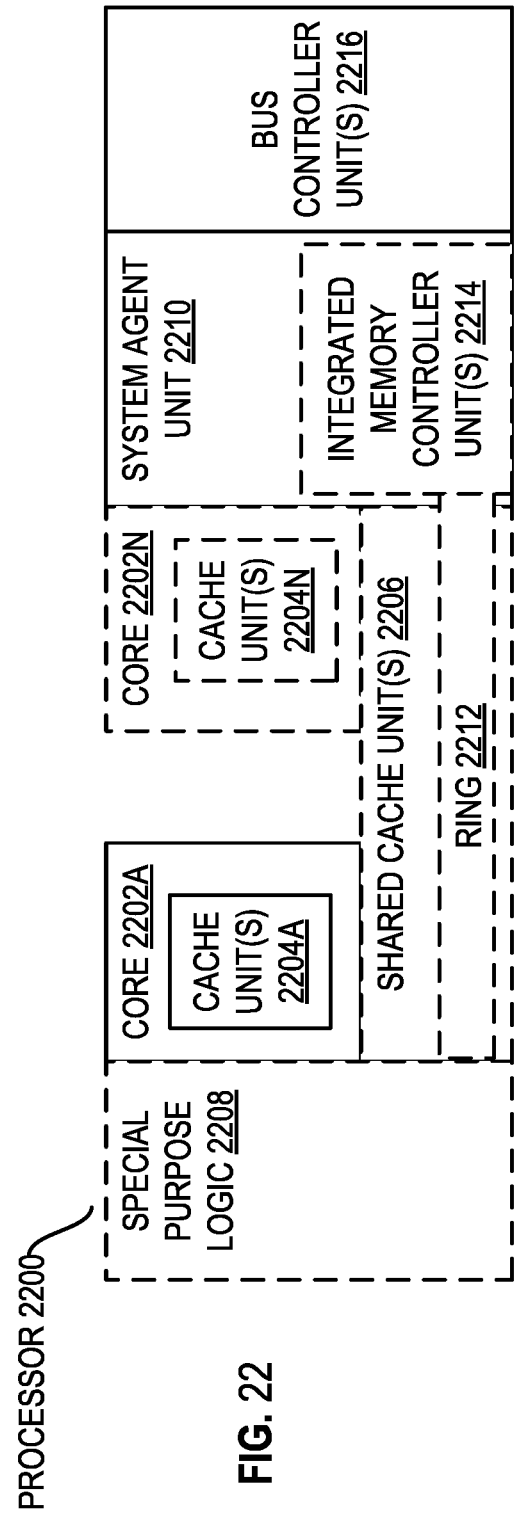
FIG. 22 is a block diagram of a processor 2200 that may have more than one core, may have an integrated memory controller, and may have integrated graphics according to embodiments.

FIG. 22 is a block diagram of a processor 2200 that may have more than one core, may have an integrated memory controller, and may have integrated graphics according to embodiments. The solid lined boxes in FIG. 22 illustrate a processor 2200 with a single core 2202A, a system agent 2210, a set of one or more bus controller units 2216, while the optional addition of the dashed lined boxes illustrates an alternative processor 2200 with multiple cores 2202A-N, a set of one or more integrated memory controller unit(s) 2214 in the system agent unit 2210, and special purpose logic 2208.

Thus, different implementations of the processor 2200 may include: 1) a CPU with the special purpose logic 2208 being integrated graphics and/or scientific (throughput) logic (which may include one or more cores), and the cores 2202A-N being one or more general purpose cores (e.g., general purpose in-order cores, general purpose out-of-order cores, a combination of the two); 2) a coprocessor with the cores 2202A-N being a large number of special purpose cores intended primarily for graphics and/or scientific (throughput); and 3) a coprocessor with the cores 2202A-N being a large number of general purpose in-order cores. Thus, the processor 2200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2206, and external memory (not shown) coupled to the set of integrated memory controller units 2214. The set of shared cache units 2206 may include one or more mid-level caches, such as level 2 (L2), level 3 (L3), level 4 (L4), or other levels of cache, a last level cache (LLC), and/or combinations thereof. While in one embodiment a ring based interconnect unit 2212 interconnects the integrated graphics logic 2208, the set of shared cache units 2206, and the system agent unit 2210/integrated memory controller unit(s) 2214, alternative embodiments may use any number of well-known techniques for interconnecting such units. In one embodiment, coherency is maintained between one or more cache units 2206 and cores 2202-A-N.

In some embodiments, one or more of the cores 2202A-N are capable of multi-threading. The system agent 2210 includes those components coordinating and operating cores 2202A-N. The system agent unit 2210 may include for example a power control unit (PCU) and a display unit. The PCU may be or include logic and components needed for regulating the power state of the cores 2202A-N and the integrated graphics logic 2208. The display unit is for driving one or more externally connected displays.

The cores 2202A-N may be homogenous or heterogeneous in terms of architecture instruction set; that is, two or more of the cores 2202A-N may be capable of execution the same instruction set, while others may be capable of executing only a subset of that instruction set or a different instruction set.

Exemplary Computer Architectures

FIGS. 23-26 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 23:
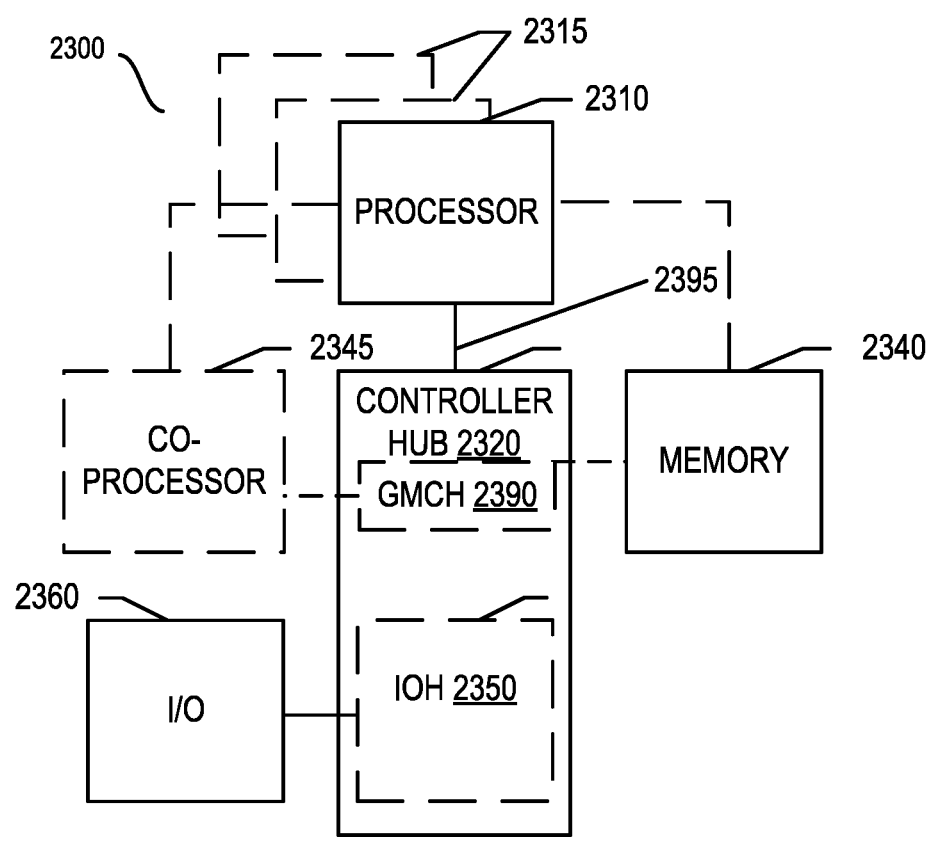
FIG. 23 shows a block diagram of a system 2300 in accordance with one embodiment of the present invention.

Referring now to FIG. 23, shown is a block diagram of a system 2300 in accordance with one embodiment of the present invention. The system 2300 may include one or more processors 2310, 2315, which are coupled to a controller hub 2320. In one embodiment the controller hub 2320 includes a graphics memory controller hub (GMCH) 2390 and an Input/Output Hub (IOH) 2350 (which may be on separate chips); the GMCH 2390 includes memory and graphics controllers to which are coupled memory 2340 and a coprocessor 2345; the IOH 2350 is couples input/output (I/O) devices 2360 to the GMCH 2390. Alternatively, one or both of the memory and graphics controllers are integrated within the processor (as described herein), the memory 2340 and the coprocessor 2345 are coupled directly to the processor 2310, and the controller hub 2320 in a single chip with the IOH 2350.

The optional nature of additional processors 2315 is denoted in FIG. 23 with broken lines. Each processor 2310, 2315 may include one or more of the processing cores described herein and may be some version of the processor 2200.

The memory 2340 may be, for example, dynamic random access memory (DRAM), phase change memory (PCM), or a combination of the two. For at least one embodiment, the controller hub 2320 communicates with the processor(s) 2310, 2315 via a multi-drop bus, such as a frontside bus (FSB), point-to-point interface such as QuickPath Interconnect (QPI), or similar connection 2395.

In one embodiment, the coprocessor 2345 is a special-purpose processor, such as, for example, a high-throughput MIC processor, a network or communication processor, compression engine, graphics processor, GPGPU, embedded processor, or the like. In one embodiment, controller hub 2320 may include an integrated graphics accelerator.

There can be a variety of differences between the physical resources 2310, 2315 in terms of a spectrum of metrics of merit including architectural, microarchitectural, thermal, power consumption characteristics, and the like.

In one embodiment, the processor 2310 executes instructions that control data processing operations of a general type. Embedded within the instructions may be coprocessor instructions. The processor 2310 recognizes these coprocessor instructions as being of a type that should be executed by the attached coprocessor 2345. Accordingly, the processor 2310 issues these coprocessor instructions (or control signals representing coprocessor instructions) on a coprocessor bus or other interconnect, to coprocessor 2345. Coprocessor(s) 2345 accept and execute the received coprocessor instructions.

Figure 24:
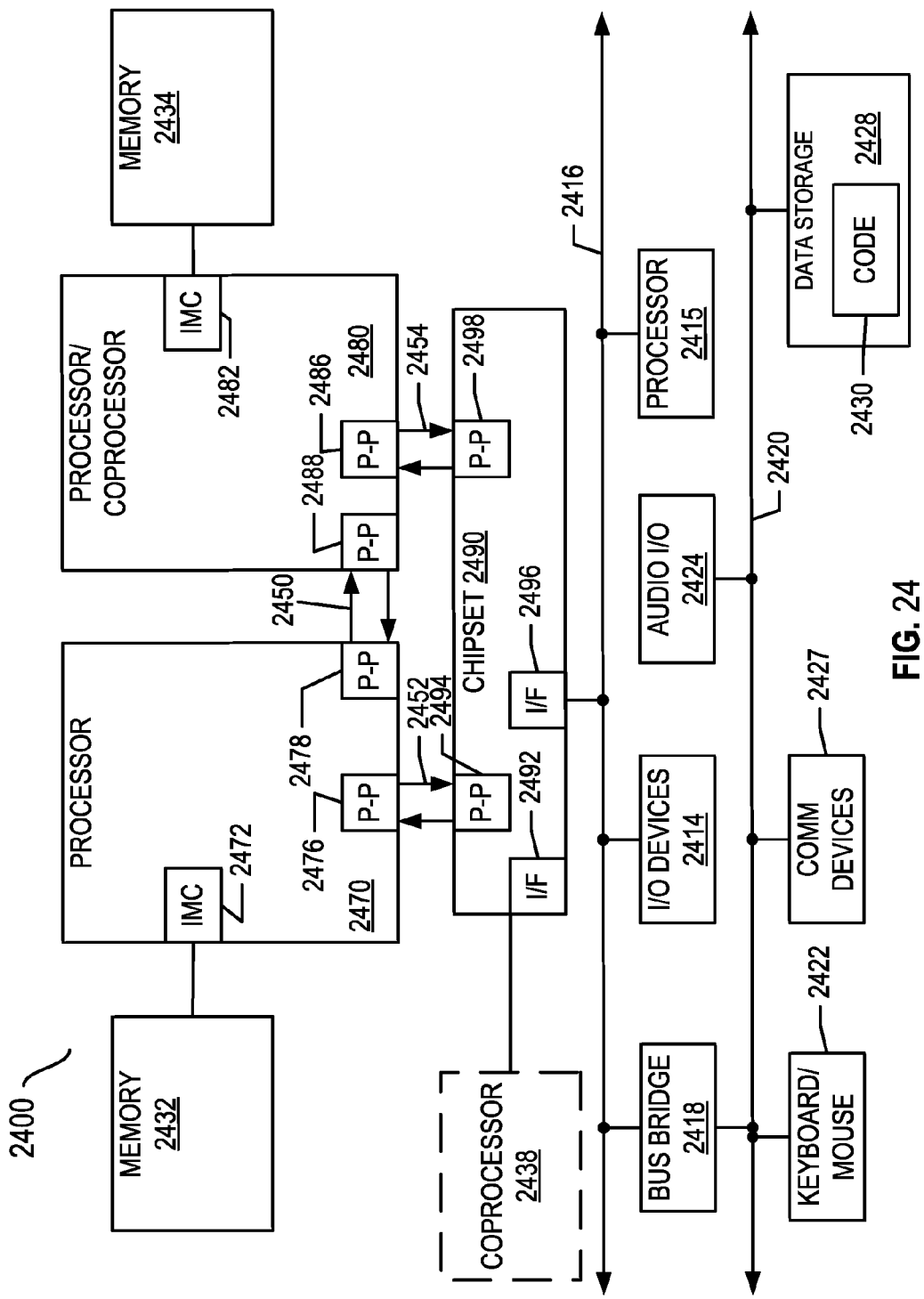
FIG. 24 shows a block diagram of a first more specific exemplary system 2400 in accordance with an embodiment of the present invention.

Referring now to FIG. 24, shown is a block diagram of a first more specific exemplary system 2400 in accordance with an embodiment of the present invention. As shown in FIG. 24, multiprocessor system 2400 is a point-to-point interconnect system, and includes a first processor 2470 and a second processor 2480 coupled via a point-to-point interconnect 2450. Each of processors 2470 and 2480 may be some version of the processor 2200. In one embodiment of the invention, processors 2470 and 2480 are respectively processors 2310 and 2315, while coprocessor 2438 is coprocessor 2345. In another embodiment, processors 2470 and 2480 are respectively processor 2310 coprocessor 2345.

Processors 2470 and 2480 are shown including integrated memory controller (IMC) units 2472 and 2482, respectively. Processor 2470 also includes as part of its bus controller units point-to-point (P-P) interfaces 2476 and 2478; similarly, second processor 2480 includes P-P interfaces 2486 and 2488. Processors 2470, 2480 may exchange information via a point-to-point (P-P) interface 2450 using P-P interface circuits 2478, 2488. As shown in FIG. 24, IMCs 2472 and 2482 couple the processors to respective memories, namely a memory 2432 and a memory 2434, which may be portions of main memory locally attached to the respective processors.

Processors 2470, 2480 may each exchange information with a chipset 2490 via individual P-P interfaces 2452, 2454 using point to point interface circuits 2476, 2494, 2486, and 2498. Chipset 2490 may optionally exchange information with the coprocessor 2438 via a high-performance interface 2492. In one embodiment, the coprocessor 2438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2490 may be coupled to a first bus 2416 via an interface 2496. In one embodiment, first bus 2416 may be a Peripheral Component Interconnect (PCI) bus, or a bus such as a PCI Express bus or another third generation I/O interconnect bus, although the scope of the present invention is not so limited.

As shown in FIG. 24, various I/O devices 2414 may be coupled to first bus 2416, along with a bus bridge 2418 which couples first bus 2416 to a second bus 2420. In one embodiment, one or more additional processor(s) 2415, such as coprocessors, high-throughput MIC processors, GPGPU's, accelerators (such as, e.g., graphics accelerators or digital signal processing (DSP) units), field programmable gate arrays, or any other processor, are coupled to first bus 2416. In one embodiment, second bus 2420 may be a low pin count (LPC) bus. Various devices may be coupled to a second bus 2420 including, for example, a keyboard and/or mouse 2422, communication devices 2427 and a storage unit 2428 such as a disk drive or other mass storage device which may include instructions/code and data 2430, in one embodiment. Further, an audio I/O 2424 may be coupled to the second bus 2420. Note that other architectures are possible. For example, instead of the point-to-point architecture of FIG. 24, a system may implement a multi-drop bus or other such architecture.

Figure 25:
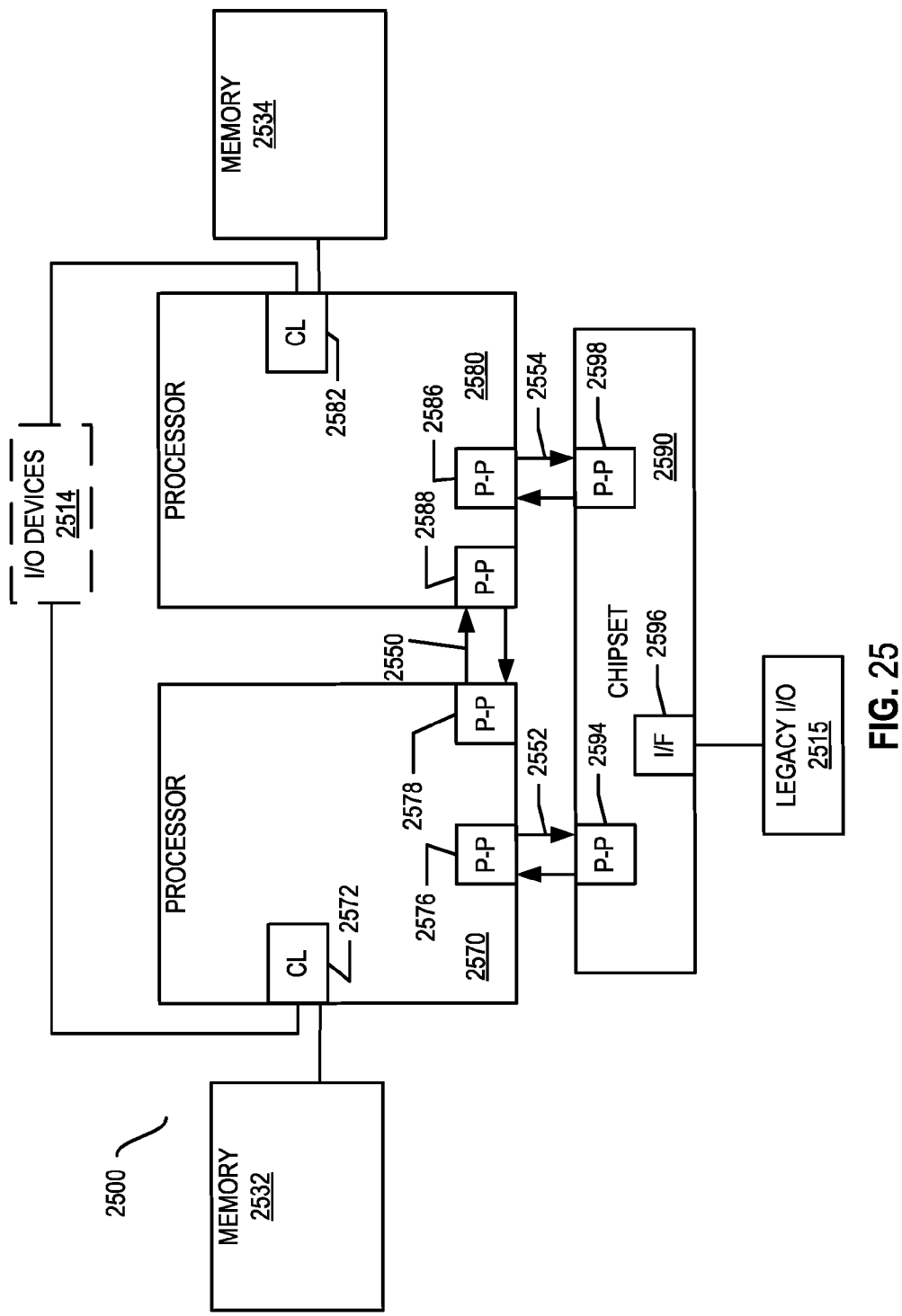
FIG. 25 shows a block diagram of a second more specific exemplary system 2500 in accordance with an embodiment of the present invention.

Referring now to FIG. 25, shown is a block diagram of a second more specific exemplary system 2500 in accordance with an embodiment of the present invention. Like elements in FIGS. 24 and 25 bear like reference numerals, and certain aspects of FIG. 24 have been omitted from FIG. 25 in order to avoid obscuring other aspects of FIG. 25.

FIG. 25 illustrates that the processors 2570, 2580 may include integrated memory and I/O control logic ("CL") 2572 and 2582, respectively. Thus, the CL 2572, 2582 include integrated memory controller units and include I/O control logic. FIG. 25 illustrates that not only are the memories 2532, 2534 coupled to the CL 2572, 2582, but also that I/O devices 2514 are also coupled to the control logic 2572, 2582. Legacy I/O devices 2515 are coupled to the chipset 2590.

Figure 26:
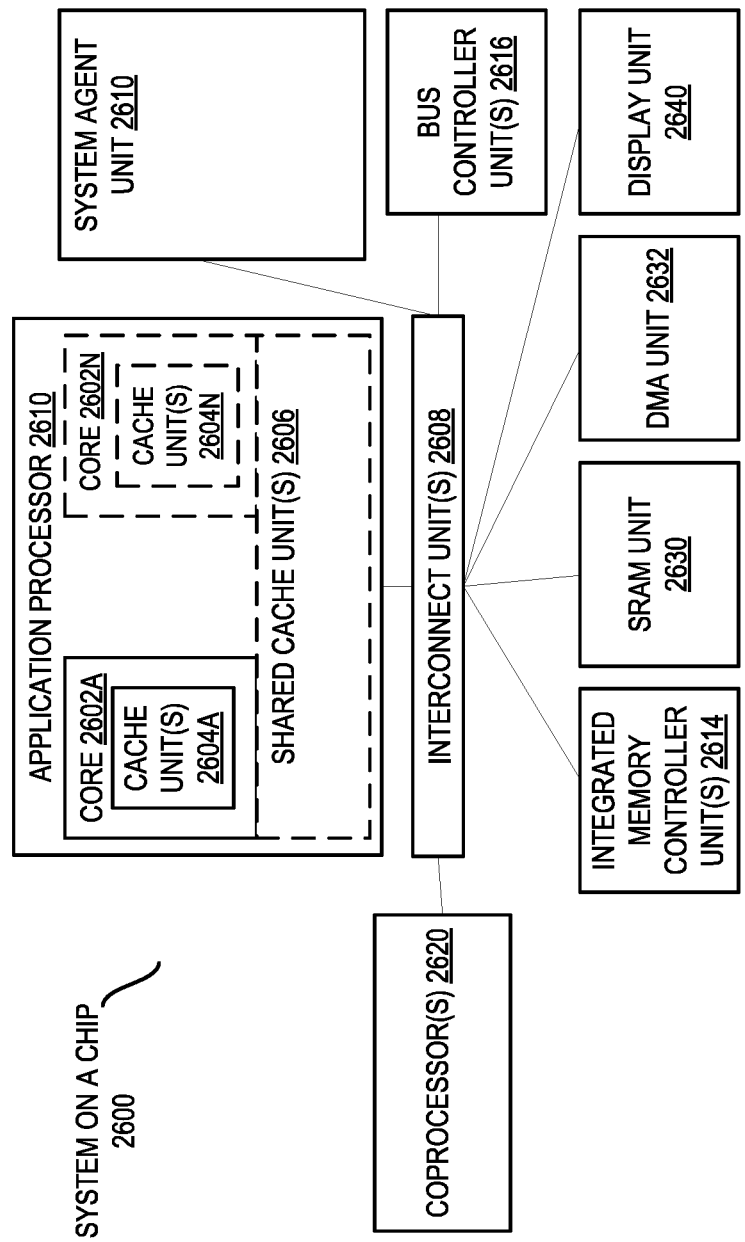
FIG. 26 shows a block diagram of a SoC 2600 in accordance with an embodiment of the present invention.

Referring now to FIG. 26, shown is a block diagram of a SoC 2600 in accordance with an embodiment of the present invention. Similar elements in FIG. 22 bear like reference numerals. Also, dashed lined boxes are optional features on more advanced SoCs. In FIG. 26, an interconnect unit(s) 2608 is coupled to: an application processor 2610 which includes a set of one or more cores 2602A-N, corresponding cache unites 2604A-N, and shared cache unit(s) 2606; a system agent unit 2610; a bus controller unit(s) 2616; an integrated memory controller unit(s) 2614; a set or one or more coprocessors 2620 which may include integrated graphics logic, an image processor, an audio processor, and a video processor; an static random access memory (SRAM) unit 2630; a direct memory access (DMA) unit 2632; and a display unit 2640 for coupling to one or more external displays. In one embodiment, the coprocessor(s) 2620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2430 illustrated in FIG. 24, may be applied to input instructions to perform the functions described herein and generate output information. The output information may be applied to one or more output devices, in known fashion or purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 27 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 27 shows a program in a high level language 2702 may be compiled using an x86 compiler 2704 to generate x86 binary code 2706 that may be natively executed by a processor with at least one x86 instruction set core 2716. The processor with at least one x86 instruction set core 2716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2704 represents a compiler that is operable to generate x86 binary code 2706 (e.g., object code) that can, with or without additional linkage processing, be executed on the processor with at least one x86 instruction set core 2716. Similarly, FIG. 27 shows the program in the high level language 2702 may be compiled using an alternative instruction set compiler 2708 to generate alternative instruction set binary code 2710 that may be natively executed by a processor without at least one x86 instruction set core 2714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2712 is used to convert the x86 binary code 2706 into code that may be natively executed by the processor without an x86 instruction set core 2714. This converted code is not likely to be the same as the alternative instruction set binary code 2710 because an instruction converter capable of this is difficult to make; however, the converted code will accomplish the general operation and be made up of instructions from the alternative instruction set. Thus, the instruction converter 2712 represents software, firmware, hardware, or a combination thereof that, through emulation, simulation or any other process, allows a processor or other electronic device that does not have an x86 instruction set processor or core to execute the x86 binary code 2706.

What is claimed is:

1. A processor, comprising:
   a fetch circuit to fetch an instruction, a format of the instruction including a first source operand identifier, a second source operand identifier, and a destination operand identifier;
   a decode circuit to decode the fetched instruction;
   a data retrieval circuit to retrieve data associated with the first source operand identifier and the second source operand identifier;
   an execution circuit to execute the decoded instruction to: determine whether a first element of the data associated with the first source operand identifier is set, if the first element is set, extract a destination index from a corresponding second element of the data associated with the second source operand identifier, and use the destination index to set a destination element of data associated with the destination operand identifier.

2. The processor of claim 1, wherein the execution circuit is further to clear the data associated with the destination operand identifier before executing the decoded instruction.

3. The processor of claim 1, wherein the data associated with the second source operand identifier comprises a plurality of indices useable to map a corresponding plurality of source elements of the data associated with the first source operand identifier to a plurality of destination elements of the data associated with the destination operand identifier.

4. The processor of claim 1, wherein the execution circuit is further to:
   count a first number of set elements in the data associated with the first source operand identifier;
   count a second number of set elements in the data associated with the destination operand identifier; and
   if the first number is greater than or equal to the second number, generate a signal indicating the second number of set elements is lower than the first number of set elements.

5. The processor of claim 1, wherein the execution circuit is further to execute the decoded instruction serially on a plurality of elements of the data associated with the first source operand identifier.

6. The processor of claim 1, wherein the execution circuit is further to execute the decoded instruction in parallel on a plurality of elements of the data associated with the first source operand identifier.

7. The processor of claim 1, wherein the execution circuit is further to execute the decoded instruction in serial on every element of the data associated with the first source operand identifier.

8. The processor of claim 1, wherein the execution circuit is further to execute the decoded instruction in parallel on every element of the data associated with the first source operand identifier.

9. The processor of claim 1, wherein the data associated with the first source operand is retrieved into a first writemask register, data associated with the destination operand is in a second writemask register, and data associated with the second source operand is in a memory location.

10. The processor of claim 1, wherein the data associated with the first source operand is retrieved into a first writemask register, data associated with the destination operand is in a second writemask register, and data associated with the second source operand is in a register.

11. A method comprising:
    fetching an instruction, a format of the instruction including a first source operand identifier, a second source operand identifier, and a destination operand identifier;
    decoding the fetched instruction;
    retrieving data associated with the first source operand identifier and the second source operand identifier; and
    executing the decoded instruction by: determining whether a first element of the data associated with the first source operand identifier is set, if the first element is set, excerpting a destination index from a corresponding second element of the data associated with the second source operand identifier, and using the destination index to set a destination element of data associated with the destination operand identifier.

12. The method of claim 11, further comprising clearing the data associated with the destination operand identifier before executing the decoded instruction.

13. The method of claim 11, wherein the data associated with the second source operand identifier comprises a plurality of indices useable to map a corresponding plurality of source elements of the data associated with the first source operand identifier to a plurality of destination elements of the data associated with the destination operand identifier.

14. The method of claim 11, further comprising:
    counting a first number of set elements in the data associated with the first source operand identifier; and
    counting a second number of set elements in the data associated with the destination operand identifier, and if the first number is greater than or equal to the second number generating a signal indicating the second number of set elements is lower than the first number of set elements.

15. The method of claim 11, further comprising executing the decoded instruction in parallel on a plurality of elements of the data associated with the first source operand identifier.

16. The method of claim 11, wherein the data associated with the first source operand is retrieved into a writemask register, data associated with the destination operand is in a writemask register, and data associated with the second source operand is in a memory location.

17. The method of claim 11, wherein the data associated with the first source operand is retrieved into a writemask register, data associated with the destination operand is in a writemask register, and data associated with the second source operand is in a register.

18. An article of manufacture comprising a non-transitory machine-readable storage medium, the non-transitory machine-readable storage medium storing instructions capable of being executed by a processor to:
    fetch an instruction, a format of the instruction including a first source operand identifier, a second source operand identifier, and a destination operand identifier;
    decode the instruction;
    retrieve data associated with the first source operand identifier and the second source operand identifier; and
    execute the decoded instruction to:
    determine whether a first element of the data associated with the first source operand identifier is set, if the first element is set, excerpt a destination index from a corresponding second element of the data associated with the second source operand identifier, and use the destination index to set a destination element of data associated with the destination operand identifier.

19. The article of manufacture of claim 18, wherein the processor is further to clear the data associated with the destination operand identifier before executing the instruction.

20. The article of manufacture of claim 18, wherein the data associated with the second source operand identifier comprises a plurality of indices to map a corresponding plurality of source elements of the data associated with the first source operand identifier to a plurality of destination elements of the data associated with the destination operand identifier.

* * * * *